US010147278B2

(12) United States Patent
Elias et al.

(10) Patent No.: US 10,147,278 B2
(45) Date of Patent: Dec. 4, 2018

(54) SYSTEMS AND METHODS FOR MOBILE DEVICE INTERFACE MODIFICATION

(71) Applicant: Gamesys Ltd., London (GB)

(72) Inventors: Hans Elias, St. Albans (GB); Adam Scott, Addlestone (GB); Rajko Monden, London (GB)

(73) Assignee: Gamesys Ltd., London (GB)

( * ) Notice: Subject to any disclaimer, the term of this patent is extended or adjusted under 35 U.S.C. 154(b) by 39 days.

(21) Appl. No.: 15/095,117

(22) Filed: Apr. 10, 2016

(65) Prior Publication Data

US 2016/0300427 A1 Oct. 13, 2016

Related U.S. Application Data

(60) Provisional application No. 62/146,287, filed on Apr. 11, 2015.

(51) Int. Cl.

*A63F 9/24* (2006.01)
*A63F 13/00* (2014.01)
*G07F 17/32* (2006.01)

(52) U.S. Cl.

CPC ........ *G07F 17/329* (2013.01); *G07F 17/3218* (2013.01); *G07F 17/3225* (2013.01)

(58) Field of Classification Search

CPC . G07F 17/329; G07F 17/3218; G07F 17/3225
USPC ........................................................ 463/19
See application file for complete search history.

(56) References Cited

U.S. PATENT DOCUMENTS

2004/0077399 A1* 4/2004 Marshall ................ A63F 3/062 463/19
2013/0337878 A1* 12/2013 Shepherd ........... G07F 17/3223 463/11

OTHER PUBLICATIONS

BallsUpBingo, "Jackpot Joy—Bingo Royale", Jun. 30, 2011, retrieved from Youtube on Sep. 9, 2017 from Internet URL<https://www.youtube.com/watch?v=C3gNKFTKMDg&t=38s>.*

* cited by examiner

*Primary Examiner* — Jay Liddle
*Assistant Examiner* — Ryan Hsu
(74) *Attorney, Agent, or Firm* — Fincham Downs, LLC; Carson C. K. Fincham

(57) ABSTRACT

Systems, methods, and articles of manufacture provide for interface modifications such as with respect to new features and functionality of bingo-style games, particularly with respect to bingo card sorting and presentation via mobile device platforms.

5 Claims, 14 Drawing Sheets

SYSTEMS AND METHODS FOR MOBILE DEVICE INTERFACE MODIFICATION

CROSS-REFERENCE TO RELATED APPLICATIONS

The present applications claims priority under 35 U.S.C. § 119(e) to, and is a non-provisional of, U.S. Provisional Patent Application No. 62/146,287 filed on Apr. 11, 2015, the contents of which are hereby incorporated by reference herein.

COPYRIGHT NOTICE

A portion of the disclosure of this application contains material that is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

Information displayed via interfaces on modern electronic devices is pervasive in many industries. With the mass-adoption of mobile electronic devices in particular, interface design has become a primary concern. Interfaces generally have a limited amount of "real estate" (a term of art meaning available electronic display area) to convey data, which is most apparent in mobile devices. One challenging area of interface design has been the application of mobile device interfaces to provide electronic games to players. The limited number of pixels (or other measure of screen size and/or resolution) available for a given interface, for example, severely limits the amount of data that can be simultaneously displayed to a player.

In bingo-style games, players often play utilizing multiple bingo tickets or cards. Managing a number of bingo tickets can become confusing and/or time-consuming for a player and it may be difficult for a player to keep track of which cards are closest to winning (e.g., have the fewest amount of missing numbers short of a win condition). These issues become compounded when a player utilizes a mobile electronic device having a small screen form-factor to play an online bingo-style game. Some online bingo-style game providers have provided interfaces that show simplified or summarized views of bingo tickets in an attempt to reduce mobile device ticket-viewing and/or managing difficulties. Such summaries, however, fail to solve the problem of small screen bingo ticket (or other game interface) management issues.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
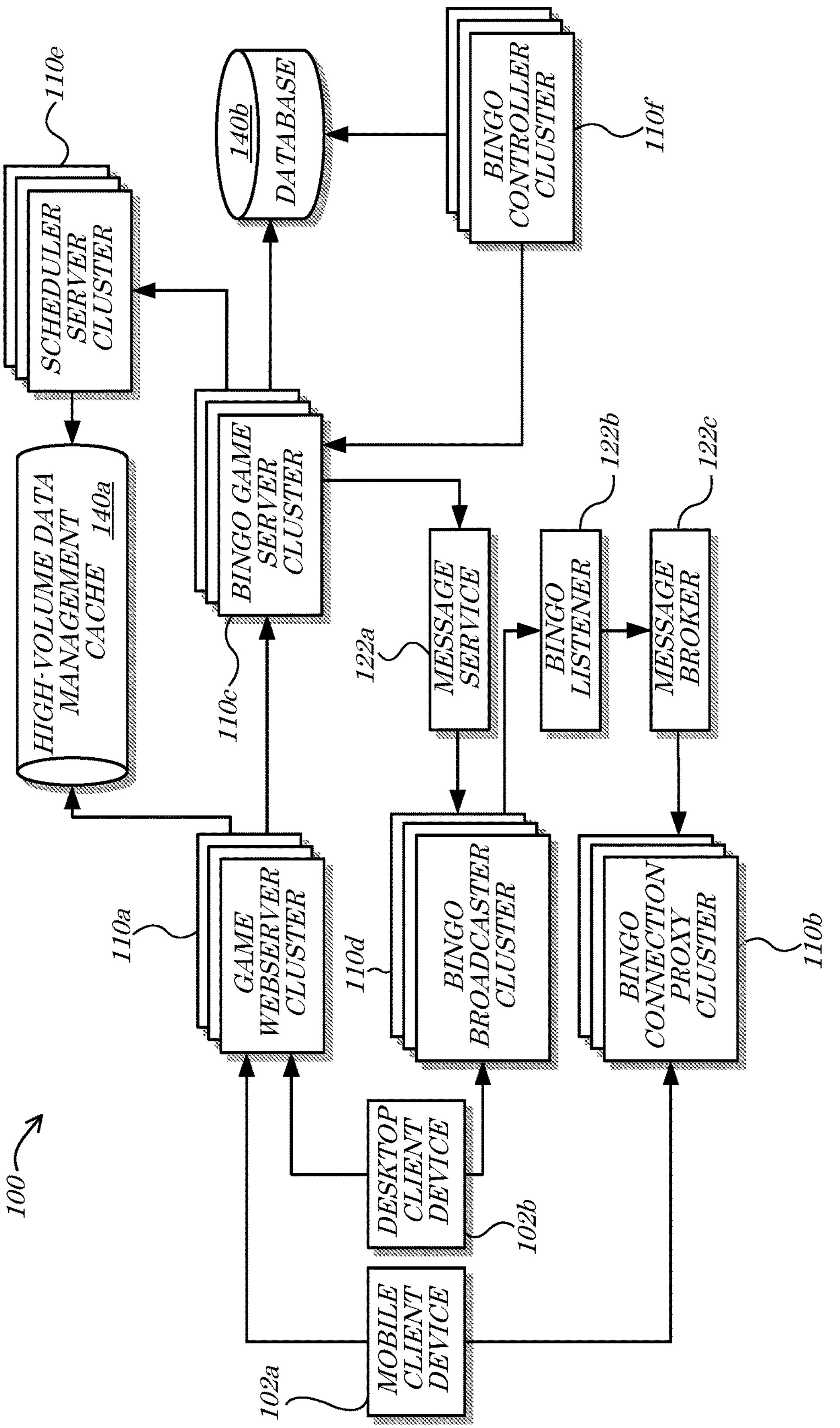
FIG. 1 is a block diagram of a system according to some embodiments.

Embodiments presented herein are descriptive of systems, apparatus, methods, and articles of manufacture for electronic device interface modification. Some embodiments are particularly provided with respect to mobile device interfaces, and some embodiments are even more particularly with respect to bingo ticket (or "card") sorting and/or presentation. According to some embodiments with respect to mobile platform online gaming, for example, the presentation of bingo tickets and other bingo-style game elements (or other elements of other mobile games) can dramatically effect game play. A standard presentation of bingo tickets on a mobile device may include presentation of a single bingo ticket at a time, with other tickets being accessible to replace the display of the currently-viewed ticket (see, for example, the example interface 920*a* of FIG. 9A herein). Some bingo-style game providers have provided mobile device interfaces that present summarized versions of multiple bingo tickets (e.g., showing the first line of each ticket).

In some embodiments herein, however, interfaces are provided as a result of bingo ticket win condition sorting. In such a manner, for example (and as describe in more detail hereinafter), a player of a bingo-style game may more readily comprehend proximity of winning conditions for multiple bingo tickets (and/or multiple lines of a single ticket) simultaneously and/or may readily comprehend which bingo tickets have multiple "close to win" conditions.

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined generally throughout the present description.

A "game", as the term is utilized herein (unless otherwise specified), may generally comprise any game (e.g., wagering or non-wagering, skill-based, chance-based, playable by hand (e.g., utilizing non-electric physical components, boards, and/or pieces), and/or electronically playable over a network) playable by one or more players in accordance with specified rules. An electronic game may be playable on a Personal Computer (PC), online in web browsers, on a game console, and/or on a mobile device such as a smart-phone or tablet computer. "Gaming" thus generally refers to play of a game (e.g., by one or more players).

A "bingo-style game", as the term is utilized herein (unless otherwise specified), generally refers to a game comprising one or more physical and/or virtual (e.g., simulated) bingo cards and/or tickets, each bingo card/ticket comprising a plurality of game symbols. Active game elements and/or symbols are randomly selected (e.g., manually from a rotating drum filled with labeled balls and/or automatically and/or electronically utilizing a Random Number Generator (RNG)), provided to the players, and winning outcomes are determined based on arrangements (patterns) of the active game symbols on individual players' bingo cards. Game symbols printed, displayed, and/or otherwise output on bingo cards may be arranged in various formats and manners. A bingo card may comprise, for example, a five-by-five (5×5) matrix with game symbols in each matrix position (e.g., twenty-five (25) symbol positions). In some embodiments, a middle matrix position may comprise a "Free Space" that is consider automatically filled and/or filled by default (e.g., leaving twenty-four (24) symbol positions remaining to be marked-off). In some embodiments, bingo tickets may comprise nine (9) columns and four (4) rows—i.e., a nine-by-four (9x4) matrix, comprising twenty-seven (27) game symbol positions. Bingo-style games are typically games of chance and may comprise "casual games", "social network games", and/or "wagering games".

A "casual game", as the term is utilized herein (unless otherwise specified), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as utilized herein (unless otherwise specified), generally refers to a type of online game that is played through a social network, and in some embodiments may feature multiplayer and/or asynchronous game play mechanics. A "social network" may refer to an online service, online community, platform, and/or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a web browser and/or web-client game, a Flash®, or Java®-scripted game, and/or may be implemented on one or more mobile platforms such as on portable electronic devices.

A "wagering game", as the term is utilized herein (unless otherwise specified), may generally comprise a game in which a player can risk a wager or other consideration, such as, but not limited to: slot-style games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as utilized herein (unless otherwise specified), generally refers to an entity or system of components which provides games for play and facilitates play of such game by use of a network such as the Internet or a proprietary or closed network (e.g., an intranet or local or wide area network). For example, a game provider may operate a website which provides games in a digital format over the Internet. In some embodiments in which a game comprising a wagering game is provided, a game provider may operate a gambling website over which wagers are accepted and results (e.g., winnings) of wagering games are provided.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As utilized herein, a "player device" is a subset of a "network device". The "network device", for example, may generally refer to any device that can communicate via a network, while the "player device" may comprise a network device that is owned and/or operated by or otherwise associated with a player (e.g., a network device specifically configured to permit use thereof by the player, such as by receiving login credentials from the player). Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components. In some embodiments, a player device may comprise an electronic device configured to initiate, conduct, facilitate, and/or otherwise permit player participation in an electronic game.

As utilized herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As utilized herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As utilized herein, the terms “information” and “data” may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term “indication”, as utilized herein (unless otherwise specified), may generally refer to any indicia and/or other information indicative of or associated with a subject, item, entity, and/or other object and/or idea. As utilized herein, the phrases “information indicative of” and “indicia” may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A “session”, as the term is utilized herein (unless otherwise specified), may generally comprise a period of time spanning a plurality of event instances (e.g., with respect to a communication and/or game session) or turns of a game, the session having a defined start and defined end. An event instance or turn is triggered upon an initiation of, or request for, at least one result of the game by a player, such as an actuation of a “start” or “spin” mechanism, which initiation causes an outcome to be determined or generated (e.g., an RNG is contacted or communicated with to identify, generate or determine a random number to be used to determine an outcome for the event instance).

As utilized herein, the terms “outcome” and “result” should be differentiated in the present description in that an “outcome” is generally a representation of a “result”, typically comprising one or more game elements or game symbols. For example, in a “fruit themed” slot-style game, a winning outcome (i.e., an outcome corresponding to some kind of award, prize or payout) may comprise a combination of three “cherry” symbols. The “result” of this outcome may be a payout of X credits awarded to the player associated with the game. In another example, in a game in which a character moves along a game interface from a starting position to a finish position, an “outcome” of the game may comprise a symbol representing one or more movements along the interface and the “result” corresponding to this outcome may be the particular number and direction of the character’s movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As utilized herein, the term “virtual currency” may generally refer to an in-game currency that may be utilized as part of a game or one or more games provided by a game provider as (i) currency for making wagers, and/or (ii) to purchase or access various in-game items, features or powers (e.g., “freemium” upgrades and/or options).

A “credit balance”, as the term is utilized herein (unless otherwise specified), may generally refer to (i) a balance of currency, whether virtual currency and/or real currency, usable for making wagers and/or purchases in a game and/or (ii) another tracking mechanism for tracking a player’s success or advancement in a game by deducting there from points or value for unsuccessful attempts at advancement and adding thereto points or value for successful attempts at advancement.

Some embodiments are descriptive of an “array” or “matrix” of symbols or game outcomes. As utilized herein, the terms “array” and “matrix” generally refer to a group of symbols, numbers, and/or expressions arranged in a plurality of rows and columns (or that can be readily and appropriately represented mathematically as being so arranged). In some embodiments, the term “array” is utilized to refer to a multi-dimensional matrix or combination of matrices while the term “matrix” is utilized to refer to a two-dimensional set of symbols or numbers (e.g., slot reel symbols and/or mathematical representations thereof). According to some embodiments, such as in the case that an array and/or matrix is populated with graphical game symbols, the array or matrix may be output and/or displayed (e.g., transmit to and/or rendered on a player device) as part of a game session.

III. Specialized Bingo-Style Game Systems

Referring first to FIG. 1, a block diagram of a bingo-style game system 100 according to some embodiments is shown. In some embodiments, the bingo-style game system 100 may comprise a bingo gaming platform such as a bingo game platform via which social, multiplayer, wagering, and/or online bingo games may be played (e.g., one or more bingo games as described in this disclosure, among others). In some embodiments, the bingo-style game system 100 may comprise a plurality of client or player devices 102*a-b*, such as, for example, a mobile client device 102*a* and/or a desktop client device 102*b*. Players (not separately shown), for example, may utilize these player devices 102*a-b* to access bingo play (and/or other game play) via the bingo-style game system 100. For example, the mobile client device 102*a* may communicate with a game webserver cluster 110*a* and/or a bingo connection proxy cluster 110*b*. In another example, the desktop client device 102*b* may communicate with the game webserver cluster 110*a* and/or a bingo broadcaster cluster 110*d*. It will be readily understood that although when describing some embodiments reference may be made to a "cluster" of devices, embodiments herein are not limited to only a plurality of such devices. Some embodiments may comprise only one of any given type of device (real or virtual).

In some embodiments, the game webserver cluster 110*a* may act as and/or comprise an interface between a plurality of players and at least one bingo server (e.g., not explicitly/separately shown, e.g., a server or device of a bingo game server cluster 110*c*). In one or more embodiments, the game webserver cluster 110*a* provides log-in functionality, website navigation, game lobby functionality, and/or game User Interface (UI) assets. In some embodiments, the game webserver cluster 110*a* receives a player request to purchase one or more bingo games, and passes such purchase requests to a bingo game server (e.g., a server or device of the bingo game server cluster 110*c*).

According to some embodiments, to aid with speed and responsiveness and the ability to scale as use fluctuates, even with respect to large amounts of data and/or a high volume of data requests, data collected by the game webserver cluster 110*a* may be cached using a high-volume data management cache 140*a* (e.g., BigMemory™ in-memory, data management service by Terracotta, Inc. of San Francisco, Calif.).

In some embodiments, the game webserver cluster 110*a* may communicate with the bingo game server cluster 110*c*, comprising one or more specialized bingo game servers (not explicitly/separately depicted). A bingo game server of the bingo game server cluster 110*c*, in accordance with some embodiments, may store logic enabling the purchase of bingo games and/or the management of bingo-style game play. A specialized bingo-style game server in accordance with some embodiments may, for example, be specially configured to simultaneously call multiple game numbers, in addition to being configured to generate one or more bingo number calls, to generate one or more (conventional) player ticket numbers, to determine one or more winners of a bingo-style game, and/or to determine a distribution of prizes.

Other examples of processes that may be performed by a bingo game server of the bingo game server cluster 110*c* (directly or indirectly) may include, but are not limited to: (i) determining a set of available numbers and/or other types of bingo symbols for a bingo game; (ii) conducting a symbol draw or otherwise determining or selecting (e.g., at random) which symbols, of a plurality of bingo symbols available (e.g., depending on the type of bingo game), are drawn for a particular round of a bingo game; (iii) transmitting an indication of at least one drawn symbol to a player device; (iv) determining one or more drawn symbols that are in play for a bingo game (e.g., that previously may have been visible and/or queued but not yet available for play); (v) transmitting an indication of at least one drawn and queued symbol to a player device; (vi) determining and/or transmitting (e.g., to a player device) one or more cards, tickets, or other type of bingo game space for a bingo game; (vii) determining one or more players of a bingo game; (viii) determining and/or establishing at least one winning pattern for a bingo game; (ix) determining at least one bingo card having at least one valid winning pattern (e.g., of daubed spaces); (x) determining an outcome of a bingo game; (xi) transmitting an indication of an outcome of a bingo game to a player device; (xii) determining one or more drawn symbols that are queued to be enabled for play in a bingo game (e.g., but are not yet available for play); (xiii) determining one or more drawn symbols for which respective visual representations are (or are to be) made visible to one or more players; (xiv) authorizing a game program to be downloaded to a player device; (xv) modifying (and/or directing a player device to modify) a game interface (e.g., to provide for electronic gaming); and/or (xvi) determining a pay table and/or payout structure for each particular bingo card of a bingo-style game (e.g., based at least in part on different buy-in amounts for different cards).

According to some embodiments, a bingo game server of the bingo game server cluster 110*c* may store game data in a database 140*b*, and/or may transmit game data to the bingo broadcaster cluster 110*d* via a message service 122*a*. In some embodiments, the message service 122*a* may comprise a scalable, asynchronous message service such as a Java™ Message Service (JMS) (e.g., JBoss® A-MQ by Red Hat or ActiveMQ™ by the Apache Software Foundation (ASF) of Forest Hill, Md.).

The database 140*b* may store, for example, game data (e.g., processed and/or defined by a specially-programmed bingo game server of the bingo game server cluster 110*c*), data associated with players (e.g., players interacting with the bingo game servers via the mobile client device 102*a* and/or the desktop client device 102*b*), and/or specialized instructions that cause various devices (e.g., of the bingo game server cluster 110*c*, a scheduler server cluster 110*e*, the game webserver cluster 110*a*, the bingo broadcaster cluster 110*d*, a bingo controller cluster 110*f*, the bingo connection proxy cluster 110*b*, the desktop client device 102*b*, and/or the mobile client device 102*a*) to operate in accordance with embodiments described herein.

A bingo game server in accordance with some embodiments and/or one or more of the client devices 102*a-b*, may store and/or have access to data useful for facilitating play of a bingo-style game. For example, a bingo game server (e.g., of the bingo game server cluster 110*c*) and/or the mobile client device 102*a* may store (i) one or more probability databases for determining one or more outcome(s) for a game, (ii) a current state or status of a game or game session, (iii) one or more user interfaces (and/or user interface components) for use in a game, (iv) one or more game themes for a game and/or (v) profiles or other personal information associated with a player of a game. It should be noted that in some embodiments such data may be stored on the bingo game server and information based on such data may be output to a player's device (e.g., a client device 102*a-b*) during play of a game, while in other embodiments a game program may be downloaded to a local memory of a player's device and thus such data may be stored on a player's device (e.g., in encrypted or other secure or tamper-resistant form).

According to some embodiments, any or all of the components of the example bingo-style game system 100 may conduct (in whole or in part), facilitate, and/or otherwise be associated with execution of one or more stored procedures, applications, processes, and/or methods (e.g., the methods 600, 700 of FIG. 6 and/or FIG. 7 herein, and/or one or more portions and/or combinations thereof) as described herein.

In some embodiments, a bingo player may, for example, connect to the bingo broadcaster cluster 110*d* via the desktop client device 102*b* and acquire bingo game data and play a bingo-style game. According to some embodiments, the bingo broadcaster cluster 110*d* sends information, such as number calls (e.g., determined by and received from a bingo game server) and/or winner information, to the bingo game player in a manner that provides for an enjoyable game play experience.

In some embodiments, the bingo broadcaster cluster 110_d_ may also or alternatively provide game data to users of mobile devices (e.g., the mobile device client 102_a_). In some embodiments, a bingo broadcaster (e.g., of the bingo broadcaster cluster 110_d_) may communicate game data to the mobile client device 102_a_ by forwarding the game data first to a bingo listener 122_b_, such as a Java™-based messaging component, which then forwards the information to a message broker 122_c_ (e.g., an ActiveMQ™ channel) and then to the bingo connection proxy cluster 110_b_ in communication with the client mobile device 102_a_.

The bingo game server cluster 110_c_ may also or alternatively, in accordance with some embodiments, manage requests to purchase bingo game tickets and award prizes to bingo game winners. The bingo controller cluster 110_f_ according to some embodiments may, for example, be specially programmed to communicate with the bingo game server cluster 110_c_ to provide scheduling information to create and schedule bingo-style games, providing information such as the start and end times for multiple games, in succession, simultaneously, or both. For example, the bingo controller cluster 110_f_ may communicate with the database 140_b_ to read stored schedules for games. The bingo controller cluster 110_f_ may, in some embodiments, create new bingo games based on a stored schedule for a predetermined time period (e.g., a twenty-four hour (24-hour) time frame). According to some embodiments, once new bingo games are created, the bingo game server cluster 110_c_ may then be informed (e.g., by a bingo controller of the bingo controller cluster 110_f_) as to what games are available, and can sell these bingo games at appropriate times (e.g., in accordance with a schedule), as indicated by the bingo controller cluster 110_f_.

In some embodiments, a bingo-style game may provide a bonus game at the end of bingo play. The bonus game may not be considered part of the initial bingo game, so in some embodiments, the scheduler server cluster 110_e_ may be utilized by the bingo-style game system 100 to set a schedule, or otherwise alter the existing bingo game schedules, to allow time for bonus game play. This scheduler server cluster 110_e_ may, in some embodiments, communicate with the bingo game server cluster 110_c_. In one or more embodiments, information from the schedule server cluster 110_e_ may be cached in the high-volume data management cache 140_a_.

The bingo-style game system 100 generally provides for specialized bingo game servers, controllers, and systems providing for advantages of scalability and accommodating communication with a variety of types of client devices, and, in accordance with some embodiments, may be further configured to provide for the specialized functions of one or more types of bingo-style games (e.g., bingo ticket and/or win condition sorting and/or presentation as described herein with respect to mobile device interface modifications).

According to some embodiments, a bingo game server may comprise a computing device for facilitating play of a bingo-style game (e.g., by receiving an input from a player, determining an outcome for a bingo game, causing an outcome of a bingo game to be displayed on a player device, facilitating a wager and/or a provision of a payout for a bingo game). For example, the bingo game server may comprise a server computer operated by a bingo-style game provider or another entity (e.g., a social network website). In some embodiments, the game server may determine an outcome for a first aspect and/or second aspect of a bingo game by requesting and receiving such an outcome from another remote server operable to provide such outcomes. In some embodiments, the bingo game server may further be operable to facilitate a bingo game program for a bingo game (e.g., a wagering game). In accordance with some embodiments, in addition to administering or facilitating play of a bingo-style game, a bingo game server may comprise one or more computing devices responsible for handling online processes such as, but not limited to: serving a website comprising one or more games to a player device and/or processing transactions (e.g., wagers, deposits into financial accounts, managing accounts, controlling games, etc.). In some embodiments, a bingo game server may comprise two or more server computers operated by the same entity (e.g., one server being primarily for storing states of games in progress and another server being primarily for storing mechanisms for determining outcomes of games, such as a random number generator).

In accordance with some embodiments, the mobile client device 102_a_ and/or the desktop client device 102_b_ may be utilized to play a wagering or non-wagering bingo-style game over a network and/or to output information relating to the game to the player participating in the game (e.g., outcomes for a round of a bingo game, numbers to call simultaneously for a bingo game session, qualifying for a level upgrade in the game, balance of credits available for play of the game, etc.). Any or all information relevant to any of the aforementioned functions may be stored locally on one or more of a client devices 102_a-b_ and/or may be accessed using one or more of the client devices 102_a-b_ (in some embodiments such information being stored on, or provided via, a bingo game server). In some embodiments, a client device 102_a-b_ may store some or all of the program instructions for providing one or more of the functions described with respect to the bingo game server (e.g., in a downloadable software application). In some embodiments, the bingo game server may be operable to authorize the one or more of the client devices 102_a-b_ to access such information and/or program instructions remotely via a network and/or download from the bingo game server (e.g., directly or via an intermediary server such as a game webserver) some or all of the program code for executing one or more of the various functions described in this disclosure. In other embodiments, outcome and result determinations may be carried out by a bingo game server (or another server with which the bingo game server communicates) and a player's device (e.g., a client device 102_a-b_)may be or comprise a terminal for displaying to an associated player such outcomes and results and other graphics and data related to a bingo-style game.

Figure 2:
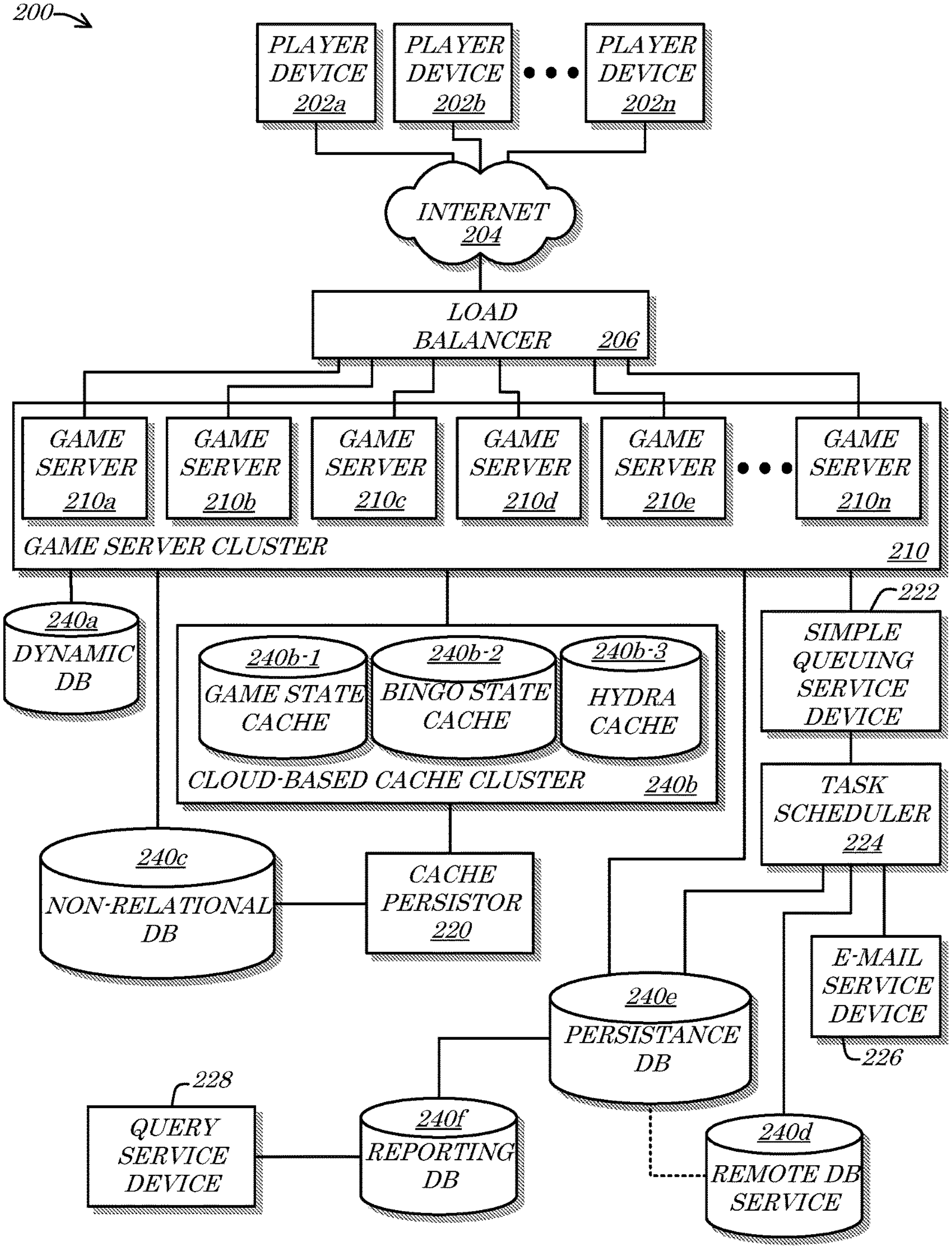
FIG. 2 is a block diagram of a system according to some embodiments.

Referring now to FIG. 2, a block diagram of a system 200 according to some embodiments is shown. In some embodiments, the system 200 may comprise a gaming platform such as a platform via which social, multiplayer, and/or online games may be played (e.g., one or more bingo-style games as described herein). In some embodiments, the system 200 may comprise a plurality of player devices 202_a-n_, the Internet 204, a load balancer 206, and/or a game server cluster 210. The plurality of player devices 202_a-n_, may, in some embodiments, be or comprise personal devices such as mobile phones or tablets. Player devices 202_a-n_ may, in some embodiments, be or comprise personal computers, kiosks, mobile phones, or some other electronic device capable of connecting to the internet. The game server cluster 210 may, in some embodiments, comprise a plurality of game servers 210_a-n_. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a bingo state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, bingo-style games, poker, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo-style game (or tournament), a second game server 210*c* may host a second particular session of an online bingo game (or tournament), a third game server 210*c* may facilitate an online poker tournament (e.g., and a corresponding plurality of game sessions that comprise the tournament), and/or a fourth game server 210*d* may provide an online slots game (e.g., by hosting one or more slot game sessions).

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer (not explicitly shown in FIG. 2). In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, WA. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202*a-n* such as by utilizing a broadcaster device (also not separately shown in FIG. 2) that transmits the time-released game results to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DynamoDB™ service provided by Amazon® Web Services, LLC. The dynamic DB 240*a* may, for example, store information specific to one or more certain game types (e.g., bingo-style games) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, bingo state (e.g., bingo-game specific state) data may be stored in the bingo state cache 240*b*-2, and/or other game and/or player information (e.g., progressive data, referral data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. For example, the data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*. In some embodiments, the persistence DB 240*e* may store and retrieve data about individual players including, for example, player history and statistics on games played and won. In one or more embodiments, player data can be used to modify the payout structure or outcome of the bingo game, to give players different gaming experiences, even if they are playing the same game.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

According to some embodiments, any or all of the player devices 202*a-n* in conjunction with one or more of the game servers 210*a-n* and/or the databases 240*a-f* (e.g., via the network 204) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Figure 3:
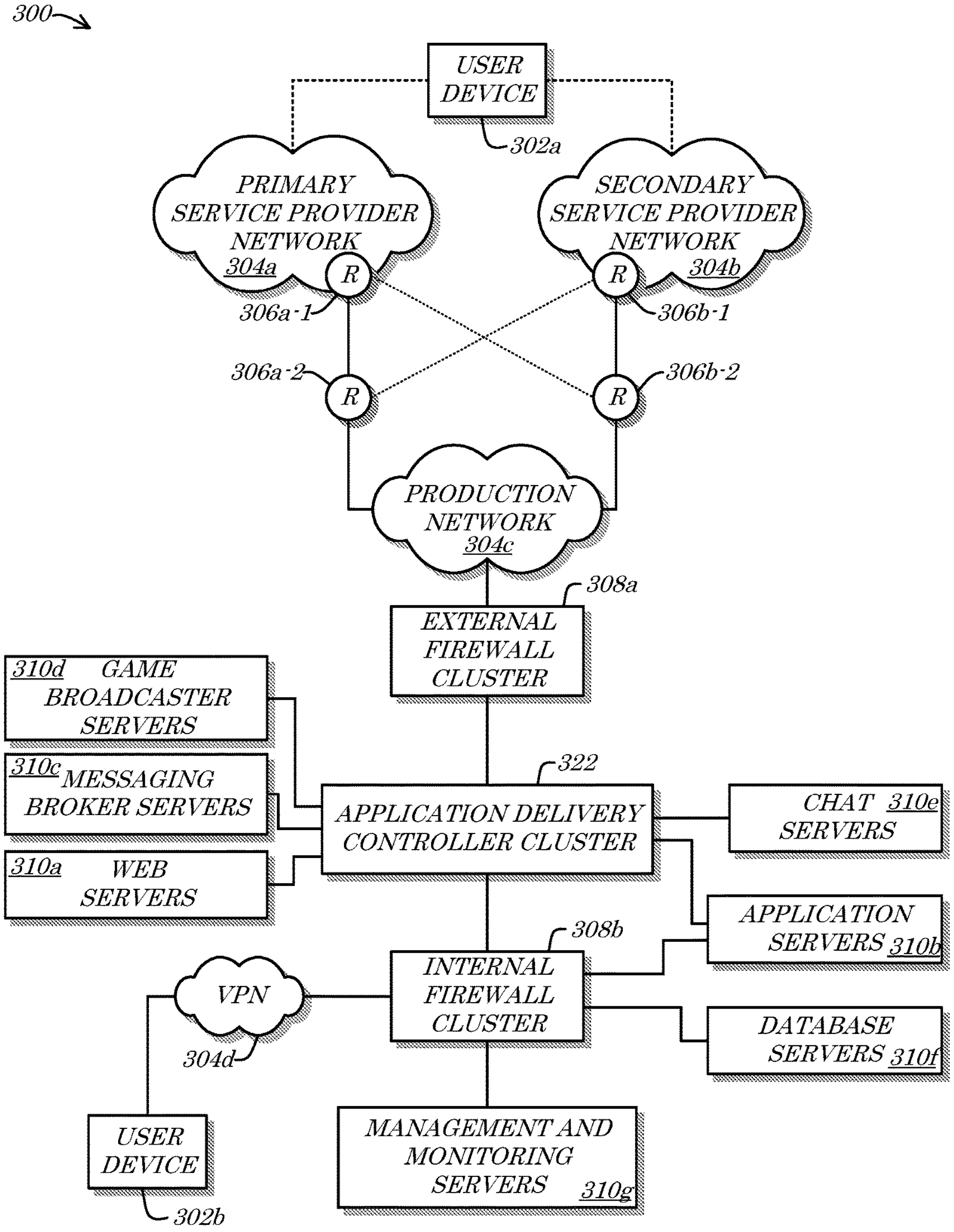
FIG. 3 is a block diagram of a system according to some embodiments.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played (e.g., one or more bingo-style games as described herein). In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described herein. Fewer or more components 302*a-b*, 304*a-b*, 306*a-b*, 308*a-b*, 310*a-g*, 322 (and/or portions thereof) and/or various configurations of the components 302*a-b*, 304*a-b*, 306*a-b*, 308*a-b*, 310*a-g*, 322 may be included in the system 300 without deviating from the scope of embodiments described herein. While multiple instances of some components 302*a-b*, 304*a-b*, 306*a-b*, 308*a-b*, 310*a-g* are depicted and while single instances of other components 322 are depicted, for example, any component 302*a-b*, 304*a-b*, 306*a-b*, 308*a-b*, 310*a-g*, 322 depicted in the system 300 may comprise a single device, a combination of devices and/or components 302*a-b*, 304*a-b*, 306*a-b*, 308*a-b*, 310*a-g*, 322, and/or a plurality of devices, as is or becomes desirable and/or practicable. Similarly, in some embodiments, one or more of the various components 302*a-b*, 304*a-b,* 306*a-b*, 308*a-b*, 310*a-g*, 322 may not be needed and/or desired in the system 300.

In some embodiments, a first user device 302*a* may comprise an electronic device owned and/or operated by a player of an online game (not explicitly shown) and/or by an entity that otherwise accesses online game content and/or services externally (e.g., requiring external login and/or access credentials and/or procedures). The first user device 302*a* may, for example, be or comprise a smart phone, smart watch, tablet or personal computer capable of accessing a network. The first user device 302*a* may, for example, be utilized to access content provided by and/or via the application delivery controller cluster 322. In some embodiments, the first user device 302*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 302*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and/or commands from the first user device 302*a*. The first user device 302*a* may, for example, submit a call for an online gaming interface (e.g., the interface 920*a-b* of FIG. 9A and/or FIG. 9B herein) to the application delivery controller cluster 322. In some embodiments, the application delivery controller cluster 322 may comprise one or more hardware, software, and/or firmware devices and/or modules configured (e.g., specially-programmed) to route events and/or responses between the first user device 302*a* and one or more of the servers 310*a-g*. In the case that the first user device 302*a* is utilized to access an online gaming interface (not explicitly shown; e.g., the interface 920*a-b* of FIG. 9A and/or FIG. 9B herein) for example, one or more of the web servers 310*a* (e.g., that may provide graphical and/or rendering elements for an interface and/or other web services) and/or the application servers 310*b* (e.g., that may provide rule and/or logic-based programming routines, elements, and/or functions—e.g., game play engines) may be called and/or managed by the application delivery controller cluster 322.

In some embodiments, the messaging broker servers 310*c* may receive and/or retrieve messages from the first user device 302*a* (and/or from one or more of the other servers 310*a-b*, 310*d-g*) and perform one or more inter-application processes in relation thereto. The messaging broker servers 310*c* may, for example, route, transform, consolidate, aggregate, store, augment, and/or otherwise process one or more requests in connection with provision of online gaming services to the first user device 302*a* (e.g., facilitating a decoupling of services provided by various applications on and/or from the various servers 310*a-b*, 310*d-g*). According to some embodiments, the game broadcaster servers 310*d* may provide scheduled releases of information descriptive of an online game. The game broadcaster servers 310*d* may, for example, provide a broadcast feed of bingo numbers, slot and/or other random (and/or pseudo-random) number results that may be accessed by (and/or transmitted to) the first user device 302*a* (e.g., in connection with the play of an online bingo, slots, and/or other game for which broadcast information may be utilized). In some embodiments, the chat servers 310*e* may provide, manage, and/or facilitate communications between the first user device 302*a* (and/or first user thereof) and one or more other player/user devices (such as a second user device 302*b* and/or other player/user devices not shown in FIG. 3).

According to some embodiments, the second user device 302*b* may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online game provider may, for example, utilize the second user device 302*b* to interface with the privately-accessible VPN 304*d*. The VPN 304*d* may, for example, provide direct access to the application servers 310*b*, the database servers 310*f*, the management and monitoring servers 310*g*, and/or the application delivery controller cluster 322. In some embodiments (as depicted in FIG. 3), such access may be gated through and/or insulated or protected by an internal firewall cluster 308*b*. The second user device 302*b* may, for example, be required to provide credentials to and/or otherwise access the application delivery controller cluster 322 and/or servers 310*a-g* via the internal firewall cluster 308*b*.

In some embodiments, the database servers 310*f* may provide access to one or more databases and/or data stores (e.g., not shown in FIG. 3; for data storage and/or retrieval). In some embodiments, the management and monitoring servers 310*g* may provide services such as monitoring, reporting, troubleshooting, analysis, configuring, etc. to the second user device 302*b*. The second user device 302*b* may, for example, access the management and monitoring servers 310*g* and/or the database servers 310*f* to run reports descriptive of online gaming operations, game play, and/or game referral setup, management, and/or analysis. According to some embodiments, either or both of the user devices 302*a-b* in conjunction with one or more of the servers 310*a-g* and/or the application delivery controller cluster 322 may conduct (in whole or in part), facilitate, and/or otherwise be associated with execution of one or more stored procedures, applications, processes, and/or methods (e.g., the methods 600, 700 of FIG. 6 and/or FIG. 7 herein, and/or one or more portions and/or combinations thereof) as described herein. In some embodiments, the user devices 302*a-b* in conjunction with one or more of the servers 310*a-g* and/or the application delivery controller cluster 322 may facilitate the execution of procedures, applications and processes that differ between the first user device 302*a* and the second user device 302*b*, creating different gaming experiences for the two users of these respective devices, even if playing the same game, in the same game session, etc.

Utilization of the term "server" with respect to the servers 310*a-g* of the system 300 of FIG. 3 is meant solely to ease description of the configuration and/or functionality of the servers 310*a-g*. The term "server" is not intended to be limiting with respect to any particular hardware, software, firmware, and/or quantities thereof utilized to implement any or all of the servers 310*a-g* of the system 300. Similarly, while multiple types and/or instances of the severs 310*a-g* are depicted in FIG. 3, any or all of the servers 310*a-g* may be implemented in, on, and/or by one or multiple computer server and/or other electronic devices.

Figure 4:
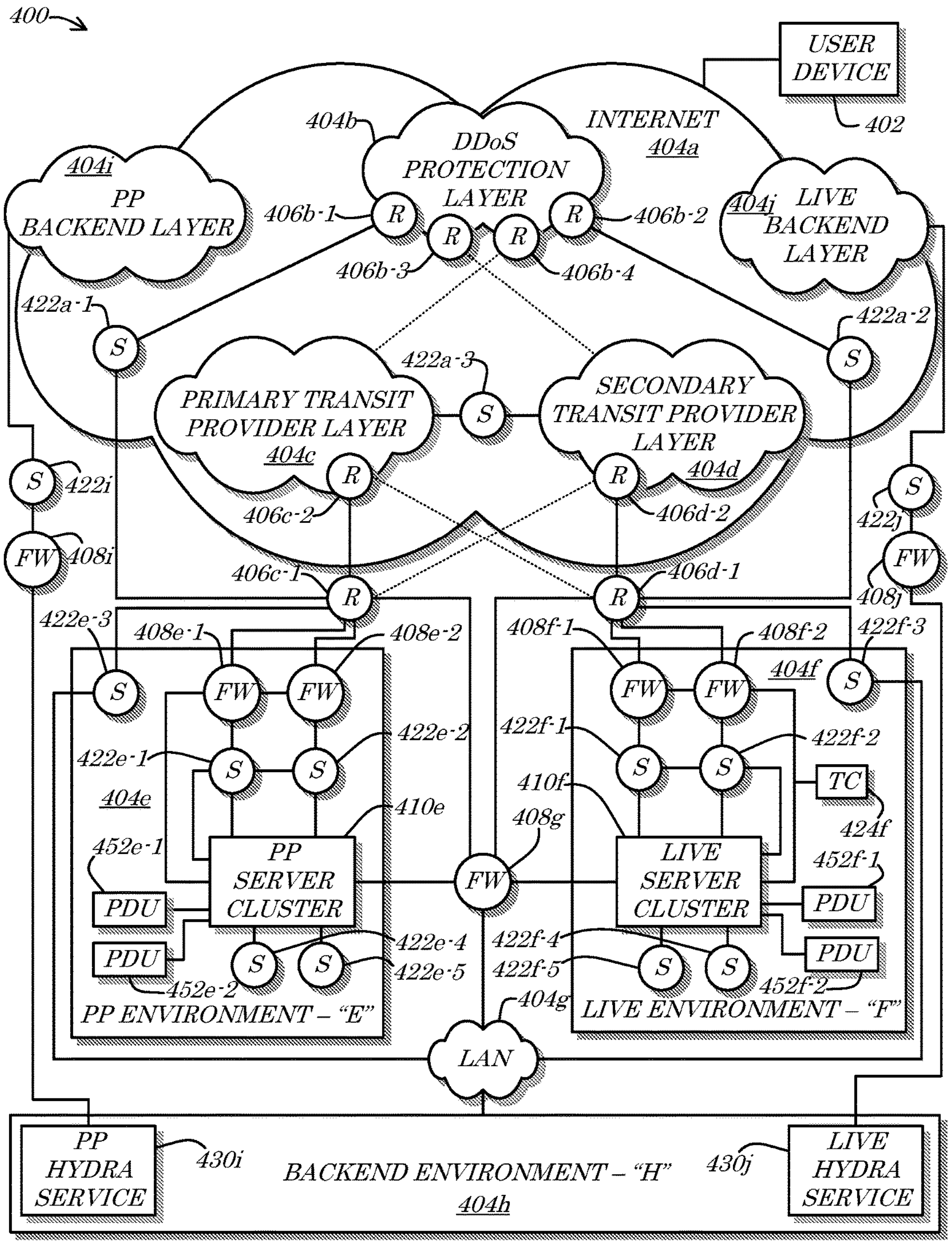
FIG. 4 is a block diagram of a system according to some embodiments.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played (e.g., one or more bingo-style games as described herein). The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404*a-j* (e.g., the Internet 404*a*, a Distributed Denial-of-Service (DDoS) protection layer 404*b*, a primary transit provider layer 404*c*, a secondary transit provider layer 404*d*, a Pre-Production (PP) environment 404*e*, a live environment 404*f*, a LAN 404*g*, a backend environment 404*h*, a PP backend layer 404*i*, and/or a live backend layer 404*j*), a plurality of routers 406*b-d*, a plurality of firewall devices 408*e-g*, 408*i-j*, a plurality of servers 410*e-f* (e.g., a PP server cluster 410*e* and/or a live server cluster 410*f*), a plurality of switching devices 422*a*, 422*e-f*, 422*i-j*, a Terminal Concentrator (TC) 424*f*, a plurality of "hydra" services 430*i-j* (e.g., a PP hydra service 430*i* and/or live hydra service 430*j*), and/or a plurality of Power Distribution Unit (PDU) devices 452*e-f*.

According to some embodiments, any or all of the components 402, 404*a-j*, 406*b-d*, 408*e-g*, 408*i-j*, 410*e-f*, 422*a*, 422*e-f*, 422*i-j*, 424*f*, 430*i-j*, 452*e-f* of the system 400 may be similar in configuration and/or functionality to any similarly named and/or numbered components described herein. Fewer or more components 402, 404*a-j*, 406*b-d*, 408*e-g*, 408*i-j*, 410*e-f*, 422*a*, 422*e-f*, 422*i-j*, 424*f*, 430*i-j*, 452*e-f* (and/or portions thereof) and/or various configurations of the components 402, 404*a-j*, 406*b-d*, 408*e-g*, 408*i-j*, 410*e-f*, 422*a*, 422*e-f*, 422*i-j*, 424*f*, 430*i-j*, 452*e-f* may be included in the system 400 without deviating from the scope of embodiments described herein. While multiple instances of some components 404*a-j*, 406*b-d*, 408*e-g*, 408*i-j*, 410*e-f*, 422*a*, 422*e-f*, 422*i-j*, 430*i-j*, 452*e-f* are depicted and while single instances of other components 402, 424*f* are depicted, for example, any component 402, 404*a-j*, 406*b-d*, 408*e-g*, 408*i-j*, 410*e-f*, 422*a*, 422*e-f*, 422*i-j*, 424*f*, 430*i-j*, 452*e-f* depicted in the system 400 may comprise a single device, a combination of devices and/or components 402, 404*a-j*, 406*b-d*, 408*e-g*, 408*i-j*, 410*e-f*, 422*a*, 422*e-f*, 422*i-j*, 424*f*, 430*i-j*, 452*e-f*, and/or a plurality of devices, as is or becomes desirable and/or practicable. Similarly, in some embodiments, one or more of the various components 402, 404*a-j*, 406*b-d*, 408*e-g*, 408*i-j*, 410*e-f*, 422*a*, 422*e-f*, 422*i-j*, 424*f*, 430*i-j*, 452*e-f* may not be needed and/or desired in the system 400.

In some embodiments, the user device 402 may be utilized to access one or more of the PP environment 404*e*, the live environment 404*f*, and/or the backend environment 404*h* via the Internet 404*a*. In some embodiments, the user device 402 may be utilized to access the backend environment 404*h* and/or the PP hydra service 430*i* via the PP backend layer 404*i*. A PP backend switch device 422*i* and/or a PP backend firewall device 408*i* may, for example, gate and/or control access to the backend environment 404*h* and/or the PP hydra service 430*i*, via the PP backend layer 404*i*. In some embodiments, the user device 402 may be utilized to access the backend environment 404*h* and/or the live hydra service 430*j* via the live backend layer 404*j*. A live backend switch device 422*j* and/or a live backend firewall device 408*j* may, for example, gate and/or control access to the backend environment 404*h* and/or the live hydra service 430*j*, via the live backend layer 404*j*.

According to some embodiments, any communications (e.g., requests, calls, and/or messages) from the user device 402 may be passed through the DDoS protection layer 404*b*. The DDoS protection layer 404*b* may, for example, monitor and/or facilitate protection against various forms of cyber attacks including, but not limited to, DDoS attacks. In some embodiments, the DDoS protection layer 404*b* may comprise and/or be in communication with a plurality of DDoS router devices 406*b*-1, 406*b*-2, 406*b*-3, 406*b*-4 that may be utilized to route and/or direct incoming communications (e.g., from the user device 402) to appropriate portions of the system 400.

In some embodiments, the DDoS protection layer 404*b* and/or a first DDoS router device 406*b*-1 may route communications from the user device 402 through and/or via a first switch device 422*a*-1 and/or to, through, and/or via a first primary transit provider router device 406*c*-1. In some embodiments, the first switch device 422*a*-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406*c*-1 may, for example, provide access to the PP environment 404*e* and/or the PP server cluster 410*e* thereof, such as via one or more PP firewall devices 408*e*-1, 408*e*-2 and/or one or more PP switch devices 422*e*-1, 422*e*-2. According to some embodiments, the PP switch devices 422*e*-1, 422*e*-2 may comprise content switching devices that process and route data (e.g., in the data link layer) based on data content. In some embodiments, the first primary transit provider router device 406*c*-1 may direct communications to, through, and/or via a PP LAN switch device 422*e*-3 that provides and/or facilitates access to the LAN 404*g*. The LAN 404*g* may, for example, provide private access to and/or between the PP environment 404*e*, the live environment 404*f*, and/or the backend environment 404*h*. In some embodiments, the first primary transit provider router device 406*c*-1 and/or the PP LAN switch device 422*e*-3 may direct communications to, through, and/or via a LAN firewall device 408*g* that provides direct access to either or both of the PP server cluster 410*e* and the live server cluster 410*f*.

According to some embodiments, the DDoS protection layer 404*b* and/or a second DDoS router device 406*b*-2 may route communications from the user device 402 through and/or via a second switch device 422*a*-2 and/or to, through, and/or via a first secondary transit provider router device 406*d*-1. In some embodiments, the second switch device 422*a*-2 may comprise a device utilized for security switching such as may implement communications in accordance with the GRE communications tunneling protocol. The first secondary transit provider router device 406*d*-1 may, for example, provide access to the live environment 404*f* and/or the live server cluster 410*f* thereof, such as via one or more live firewall devices 408*f*-1, 408*f*-2 and/or one or more live switch devices 422*f*-1, 422*f*-2. According to some embodiments, the live switch devices 422*f*-1, 422*f*-2 may comprise content switching devices that process and route data (e.g., in the data link layer) based on data content. In some embodiments, the first secondary transit provider router device 406*d*-1 may direct communications to, through, and/or via a live LAN switch device 422*f*-3 that provides and/or facilitates access to the LAN 404*g*. In some embodiments, the first secondary transit provider router device 406*d*-1 and/or the live LAN switch device 422*f*-3 may direct communications to, through, and/or via the LAN firewall device 408*g* that provides direct access to either or both of the PP server cluster 410*e* and the live server cluster 410*f*.

In some embodiments, the DDoS protection layer 404*b* and/or one or more of a third DDoS router device 406*b*-3 and/or a fourth DDoS router device 406*b*-4 may route communications from the user device 402 through and/or via one or more of the primary transit provider layer 404*c* and/or the secondary transit provider layer 404*d*. In some embodiments, a transit provider switch device 422*a*-3 may direct, swap, route, and/or manage communications between the primary transit provider layer 404*c* and the secondary transit provider layer 404*d*. According to some embodiments, the transit provider switch device 422*a*-3 may comprise a switching device that operates in accordance with an Exterior Border Gateway Protocol (EBGP)—e.g., the transit provider switch device 422*a*-3 may comprise one or more edge or border routers. In some embodiments, the first primary transit provider router device 406*c*-1, the first secondary transit provider router device 406*d*-1, a second primary transit provider router device 406*c*-2, and/or a second secondary transit provider router device 406*d*-2 may be utilized to route and/or direct communications between (i) the primary transit provider layer 404*c* and/or the secondary transit provider layer 404*d* and (ii) the PP environment 404*e* and/or the live environment 404*f*.

According to some embodiments, the PP server cluster 410*e* and/or the PP environment 404*e* may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452*e*-1, 452*e*-2 may generally provide power distribution, supply, management, backup, and/or conditioning services (e.g., to the PP server cluster 410*e*) as is or becomes desired. According to some embodiments, additional switch devices 422*e*-4, 422*e*-5 may be utilized to distribute, balance, manage and/or control communications to, from, and/or within the PP server cluster 410*e*.

In some embodiments, the live server cluster 410*f* and/or the live environment 404*f* may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452*f*-1, 452*f*-2 may generally provide power distribution, supply, management, backup, and/or conditioning services (e.g., to the live server cluster 410*f*) as is or becomes desired. According to some embodiments, additional switch devices 422*f*-4, 422*f*-5 may be utilized to distribute, balance, manage and/or control communications to, from, and/or within the live server cluster 410*f*. In some embodiments, the TC device 424*f* may be utilized to manage communications from a variety of data sources such as by providing communication capability between various communications channels (not separately depicted in FIG. 4).

According to some embodiments, the user device 402 in conjunction with the live server cluster 410*f* (e.g., via the Internet 404*a*) may conduct (in whole or in part), facilitate, and/or otherwise be associated with execution of one or more stored procedures, applications, processes, and/or methods (e.g., the method 600 of FIG. 6 herein, and/or one or more portions thereof) as described herein. In some embodiments, the user device 402 in conjunction with the live server cluster 410*f* may conduct, or facilitate the execution of procedures, applications and processes that differ between different user devices 402 (not shown explicitly/separately in FIG. 4), creating different gaming experiences for the two users of these devices, even if playing the same game, in the same game session, etc.

Figure 5:
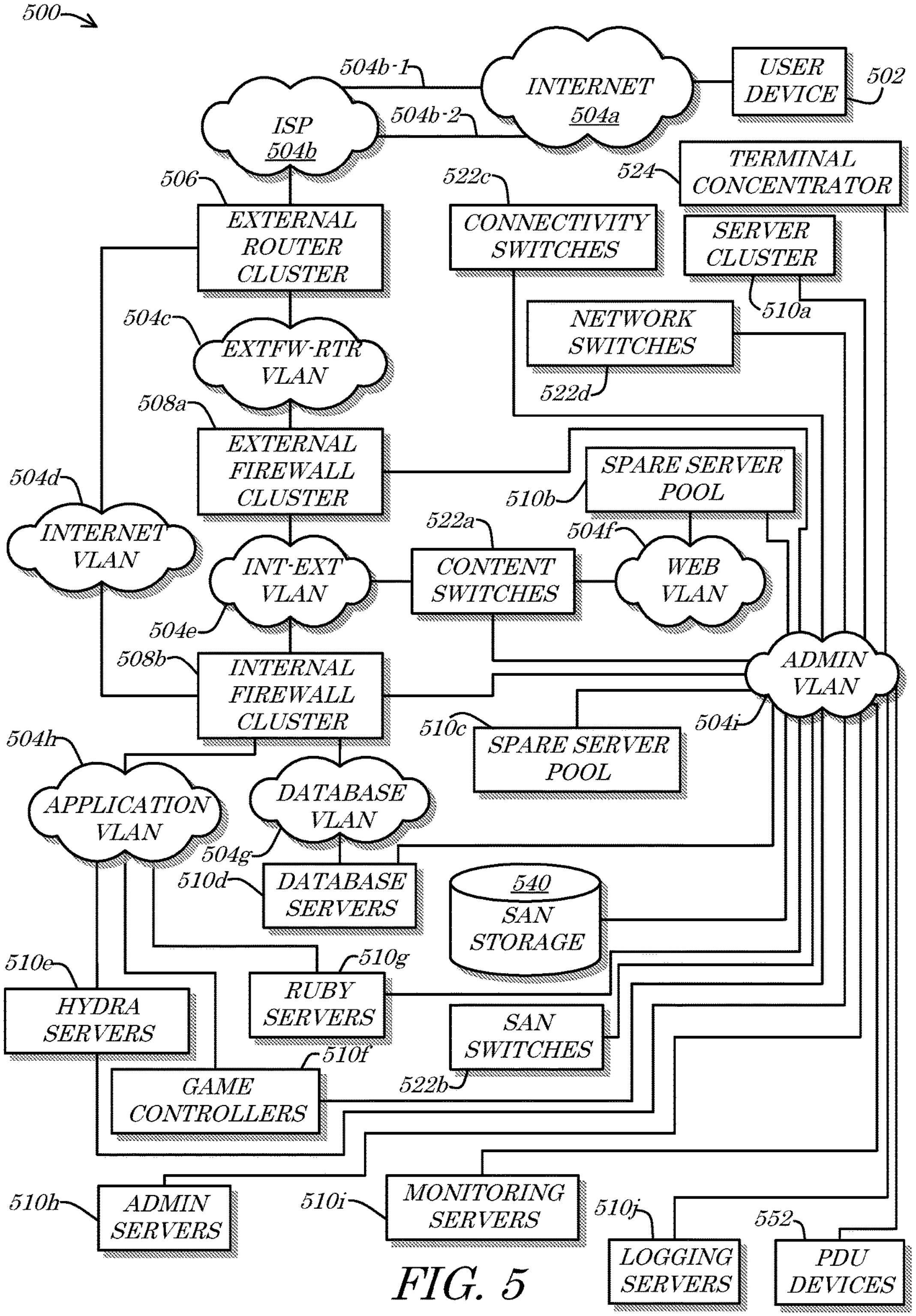
FIG. 5 is a block diagram of a system according to some embodiments.

Turning to FIG. 5, a block diagram of a system 500 according to some embodiments is shown. In some embodiments, the system 500 may comprise and/or define a "back-end" architecture of a gaming platform such as a platform via which social, multiplayer, and/or online games may be played (e.g., one or more bingo-style games as described herein). The system 500 may be utilized in conjunction with the systems 300, 400 if FIG. 3 and/or FIG. 4 herein, for example, and/or may be similar in configuration and/or functionality to the backend environment 404*h* of the system 400 of FIG. 4. In some embodiments, the system 500 may comprise a user device 502, a plurality of networks (and/or environments and/or layers) 504*a-i* (e.g., the Internet 504*a*, an ISP 504*b*, an External Firewall-Router (EXTFW-RTR) Virtual LAN (VLAN) 504*c*, an Internet VLAN 504*d*, an Internal-External (INT-EXT) VLAN 504*e*, a web VLAN 504*f*, a database VLAN 504*g*, an application VLAN 504*h*, and/or an administrator VLAN 504*i*), an external router cluster 506, a plurality of firewall clusters 508*a-b* (e.g., an external firewall cluster 508*a* and/or an internal firewall cluster 508*b*), a plurality of servers 510*a-j* (e.g., a server cluster 510*a*, a first spare server pool 510*b*, a second spare server pool 510*c*, database servers 510*d*, "hydra" servers 510*e*, game controllers 510*f*, ruby servers 510*g*, admin servers 510*h*, monitoring servers 510*i*, and/or logging servers 510*j*), a plurality of switches 522*a-d* (e.g., content switches 522*a*, Storage Area Network (SAN) switches 522*b*, connectivity switches 522*c*, and/or network switches 522*d*), a TC device 524, a SAN storage device 540, and/or one or more PDU devices 552.

According to some embodiments, any or all of the components 502, 504*a*-1, 506, 508*a-b*, 510*a-j*, 522*a-d*, 524, 540, 552 of the system 500 may be similar in configuration and/or functionality to any similarly named and/or numbered components described herein. Fewer or more components 502, 504*a*-1, 506, 508*a-b*, 510*a-j*, 522*a-d*, 524, 540, 552 (and/or portions thereof) and/or various configurations of the components 502, 504*a*-1, 506, 508*a-b*, 510*a-j*, 522*a-d*, 524, 540, 552 may be included in the system 500 without deviating from the scope of embodiments described herein. While multiple instances of some components 504*a*-1, 508*a-b*, 510*a-j*, 522*a-d* are depicted and while single instances of other components 502, 506, 524, 540, 552 are depicted, for example, any component 502, 504*a*-1, 506, 508*a-b*, 510*a-j*, 522*a-d*, 524, 540, 552 depicted in the system 500 may comprise a single device, a combination of devices and/or components 502, 504*a*-1, 506, 508*a-b*, 510*a-j*, 522*a-d*, 524, 540, 552, and/or a plurality of devices, as is or becomes desirable and/or practicable. Similarly, in some embodiments, one or more of the various components 502, 504*a*-1, 506, 508*a-b*, 510*a-j*, 522*a-d*, 524, 540, 552 may not be needed and/or desired in the system 500.

In some embodiments, the user device 502 may be utilized to access and/or interface with one or more of the servers 510*a-j* via the Internet 504*a*. In some embodiments, the Internet 502*a* may be linked to the ISP 504*b* via multiple (e.g., redundant) connectivity paths 504*b*-1, 504*b*-2 (e.g., for load balancing, security, and/or failure recovery). According to some embodiments, the ISP 504*b* may be in communication with (and/or comprise) the external router cluster 506. The external router cluster 506 may route certain requests, calls, and/or transmissions (and/or users—e.g., based on credentials and/or other information) through the EXTFW-RTR VLAN 504*c* and/or through the external firewall cluster 508*a*, for example, and/or may route certain requests, calls, and/or transmissions (and/or users—e.g., based on credentials and/or other information) through the Internet VLAN 504*d* and/or through the internal firewall cluster 508*b*.

In the case that a user (not shown) of the user device 502 comprises an online game player, consumer, and/or other member of the public, for example, the external router cluster 506 may direct communications through the EXTFW-RTR VLAN 504*c* and/or through the external firewall cluster 508*a*. In the case that the user of the user device 502 comprises a programmer, tester, employee, and/or other agent of a game provider and/or other entity that operates the system 500, for example, the external router cluster 506 may direct communications through the Internet VLAN 504*d* and/or through the internal firewall cluster 508*b*. In some embodiments, access via either or both of the external firewall cluster 508*a* and/or the internal firewall cluster 508*b* may permit the user device 502 to communicate via the INT-EXT VLAN 504*e*. The INT-EXT VLAN 504*e* may, for example, provide access to the content switches 522*a* which may, in some embodiments, serve content from any or all of the servers 510*a-j* to the user device 502, as is or becomes appropriate or desired. In some embodiments, the content switches 522*a* may communicate with the first spare server pool 510*b* via the web LAN 504*f*.

According to some embodiments, private and/or other specialized access to the system 500 via the internal firewall cluster 508*b* may permit the user device 502 to communicate via one or more of the database VLAN 504*g*, the application VLAN 504*h*, and/or the admin VLAN 504*i*. The database VLAN 504*g* may be utilized, for example, to access and/or communicate with the database servers 510*d*. In some embodiments, the application VLAN 504*h* may be utilized to access and/or communicate with any or all of the hydra servers 510*e*, the game controllers 510*f*, and/or the ruby servers 510*g*.

The admin VLAN 504*i* may allow, promote, conduct, facilitate, and/or manage a wide variety of communications within the system 500. The admin VLAN 504*i* may, for example, communicatively connect and/or couple any or all of the firewalls 508*a-b*, the servers 510*a-j*, the switches 522*a-d*, the TC device 524, the SAN storage 540, and/or the PDU devices 552. The user device 502 may be utilized, in conjunction with the admin servers 510*h* and/or via the admin VLAN 504*i* for example, to define, edit, adjust, manage, and/or otherwise access settings (and/or data) of the firewalls 508*a-b*, any or all of the switches 522*a-d*, the TC device 524, and/or the PDU devices 552. In some embodiments, the user device 502 (and/or the admin servers 510*h*) may be utilized to manage and/or access content, rules, settings, and/or performance characteristics or preferences for any or all of the servers 510*a-j*.

In some embodiments, the server cluster 510*a* may comprise one or more servers and/or other electronic controller devices (e.g., blade servers) configured to provide online gaming data (e.g., interfaces (such as the example interfaces 920*a-b* of FIG. 9A and/or FIG. 9B herein), outcomes, and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, results, graphics, sounds, and/or other media to the user device 502 (e.g., via the application VLAN 504*h*). In some embodiments, the ruby servers 510*g* may comprise one or more processing devices configured to provide access to one or more programming languages (e.g., "Ruby") and/or Application Programming Interface (API) mechanisms via which the servers 510*a-j* and/or other portions of the system 500 may be configured to operate (e.g., in accordance with specially and/or pre-programmed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

According to some embodiments, the user device 502 in conjunction with one or more of the servers 510*a-j* (e.g., via the Internet 504*a*) may conduct (in whole or in part), facilitate, and/or otherwise be associated with execution of one or more stored procedures, applications, processes, and/or methods (e.g., the method 600 of FIG. 6 herein, and/or one or more portions thereof) as described herein. In some embodiments, the user device 502 in conjunction with one or more of the servers 510*a-j* may facilitate the execution of procedures, applications and processes that differ between different user devices 502 (not shown explicitly/separately in FIG. 5), creating different gaming experiences for two players, even if playing the same game, in the same game session, etc.

IV. Methods of Interface Modification

Figure 6:
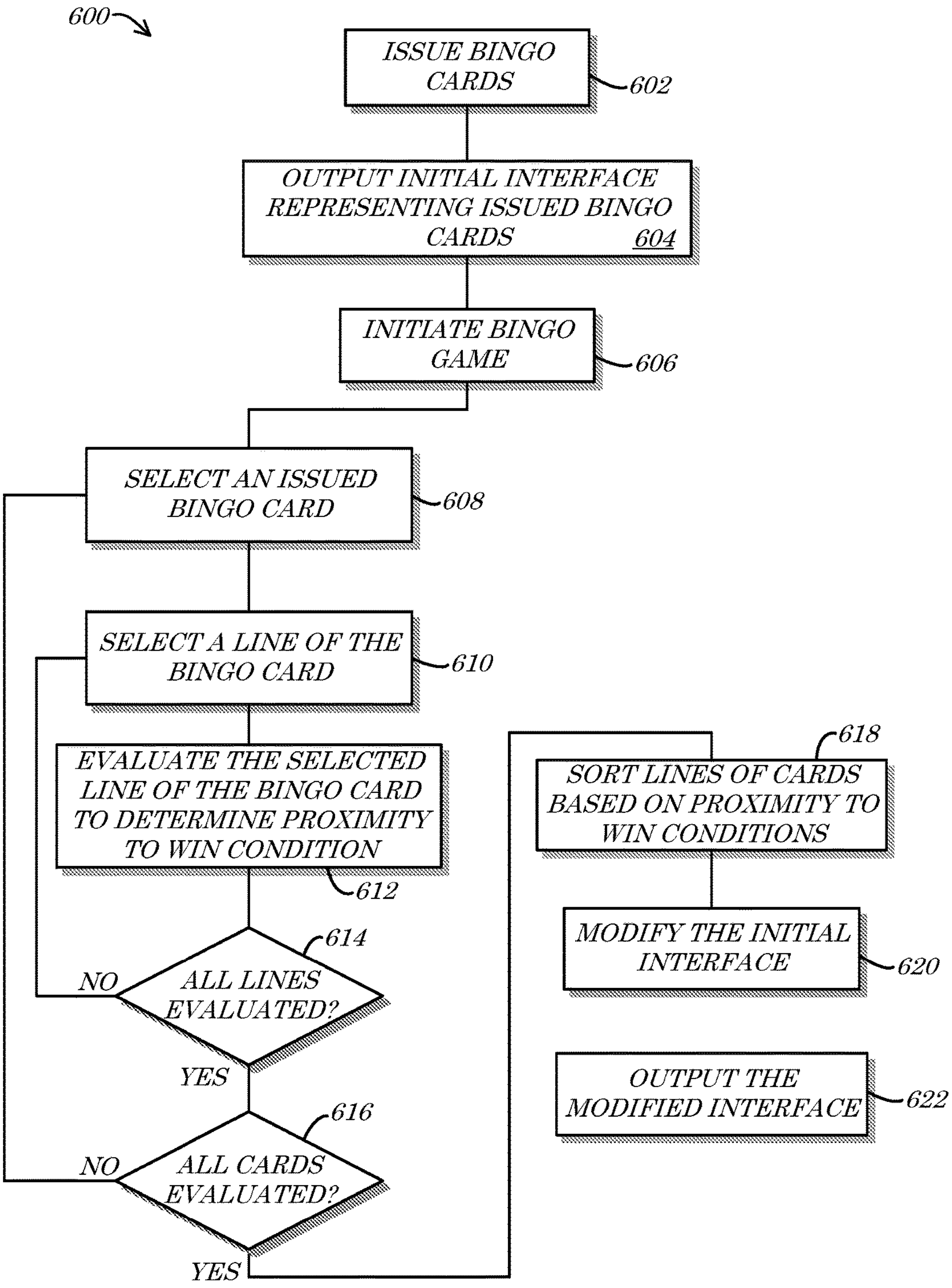
FIG. 6 is a flow diagram of a method according to some embodiments.

Referring now to FIG. 6, a flow diagram of a method 600 according to some embodiments is shown. In some embodiments, the method 600 may be performed and/or implemented by and/or otherwise associated with one or more specialized and/or computerized processing devices (e.g., the player and/or user devices 102*a-b*, 202*a-n*, 302*a-b*, 402, 502 and/or the servers, apparatus, and/or controller devices 110*a-f*, 210*a-n*, 310*a-g*, 410*e-f*, 510*a-j*, 810 of FIG. 1, FIG. 2, FIG. 3, FIG. 4, FIG. 5, and/or FIG. 8 herein), specialized computers, computer terminals, personal or mobile devices, tablets, computer servers, kiosks, LCD or LED touchscreens, computer systems and/or networks, and/or any combinations thereof (e.g., by one or more online game providers and/or online gaming player processing devices). In some embodiments, the method 600 may be embodied in, facilitated by, and/or otherwise associated with various input mechanisms and/or interfaces (such as the example interfaces 920*a-b* of FIG. 9A and/or FIG. 9B herein).

The process and/or flow diagrams described herein do not necessarily imply a fixed order to any depicted actions, steps, and/or procedures, and embodiments may generally be performed in any order that is practicable unless otherwise and specifically noted. In some embodiments, although a fixed order is not generally implied, the various components, steps, or procedures of a given method as disclosed herein may be specifically implemented in the order depicted and/or procedures, steps, or components shown following another procedure, step, or component may be performed and/or triggered in response to one or more previously-depicted and/or connected procedures, steps, or components. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

According to some embodiments, the method 600 may comprise issuing (e.g., by the processing device and/or via the electronic communications network device), a plurality of bingo cards, at 602. Once a player's buy-in or wager amount is received, for example, the player may be issued and/or provided with the plurality of bingo cards (e.g., physical, e.g., a ticket or a placard, and/or electronic, e.g., virtual or simulated) associated with the player's buy-in amount. In some embodiments, each bingo card (or play line or symbol/number thereof) may be identified by an assigned identifier such as a unique (or semi-unique, such as unique for any given time periods such as a given day) numeric identifier, that may for example be encoded or encrypted. Bingo cards may generally comprise a number of lines with each line comprising a plurality of symbols such as numbers. The symbols/numbers of a bingo card (and of the lines thereof) may be generated, as part of the issuance process, by execution of an RNG device. Each of the numbers populated on a given bingo card (e.g., in an array or matrix) may, for example, be derived and/or defined by and RNG symbol/number generation process. In some embodiments, a plurality of bingo cards may be pre-populated with symbols/numbers and the player may be randomly or sequentially assigned a number of cards corresponding to a buy-in amount provided by the player.

In some embodiments, the method 600 may comprise outputting (e.g., by the processing device and/or via an output device and/or electronic communications network device) an initial interface representing the issued bingo cards, at 604. In the case that a player utilizes a mobile, portable, or small screen form factor device to participate in an online or network bingo-style game, for example, the plurality of bingo cards may be presented and/or indicated to the player in a variety of manners. Typically, a single bingo card from the plurality of purchased and/or active cards is shown, which takes up all the screen "real estate", and the player is provided with a mechanism to switch to a view of a different bingo card. Thus, the player can typically view a single bingo card at a time. In some systems, bingo cards may be summarized so that the summarized representations allow fitting multiple bingo card summaries on a single small screen view. Such systems are advantageous in that multiple bingo card may be viewed, in part, simultaneously (See, e.g., the first interface 920*a* of FIG. 9A herein). According to some embodiments, the initial interface may be output or caused to be output by a transmittal of one or more interface configuration commands from a central server to a remote mobile device of a player. The commands may define or identify, for example, various graphical elements of the initial interface and/or information defining various positioning, formatting, and/or behavior characteristics of the elements. The transmitted commands may, for example, define how a bingo card should be displayed and/or populated on a particular screen of the remote mobile device. According to some embodiments, the outputting may comprise and/or be preceded or triggered by a signal received from the remote mobile device. The remote mobile device may transmit, and the central server device may receive for example, a signal defining or identifying parameters of the display of the remote mobile device, e.g., a device type (such as manufacturer, model, and/or serial number or, MAC address), a screen type, and/or screen characteristics such as pixel or other dimensions (e.g., actual physical pixels and/or rendered pixels, e.g., four hundred and fourteen by six hundred and twenty-eight (414×628) pixels, screen dimensions such as three by four (3×4) inches, or a diagonal screen measurement such as five and one half (5.5) inches diagonally). The interface components for rendering an image of one or more bingo cards (or lines or numbers thereof) may then, for example, be calculated or selected (e.g., from a pre-calculated set) to fit the given screen size/parameters. The commands transmitted back to the remote mobile device may then accordingly provide for an output of the issued bingo cards via the initial interface that fits within the given "real estate" for the display device of the remote mobile device.

In some embodiments, the method 600 may comprise initiating (e.g., by the processing device and/or via the electronic communications network device) a play of the bingo-style game, at 606. Bingo numbers may be "called" for example, one at time typically, in series. In an electronic gaming system as described herein, a bingo number broadcast device (e.g., the bingo broadcaster cluster 110*d*, the game broadcaster servers 310*d*, and/or the message broker 122*c* of FIG. 1 and/or FIG. 3 herein) may transmit or broadcast indications of the "called" or "active" numbers (or symbols), e.g., to a plurality of remote player devices. According to some embodiments, each remote player device may execute a bingo-style game client-side application that causes the remote player device to listen for the "called" numbers from the broadcaster. In some embodiments, the interface may be updated to display any or all "called" numbers to the remote player(s).

According to some embodiments, once bingo play is initiated by "calling" at least one first number/symbol (and/or after each bingo number callout), some bingo cards may have earned "daubs", while other have not. Accordingly, some bingo cards may be closer to achieving a winning condition at any given time, than other bingo cards. A first bingo card having four (4) out of five (5) numbers in a given row daubed, for example, is only one (1) number away from a five-in-a-row win condition, while a second bingo card having two (2) out of five (5) numbers in a row/column/etc. daubed is three (3) numbers away from the same win condition. In some embodiments, the bingo cards (e.g., issued at 602) may be analyzed to determine a win status (or win proximity status) thereof.

In some embodiments, the method 600 may comprise selecting an issued bingo card, at 608. Each bingo card issued to any or all players may, for example, be, in-turn, selected for evaluation. According to some embodiments, the identifiers of all active/issued bingo cards for a particular bingo game session may be identified and an identifier from the set of identifiers may be selected, e.g., sequentially or randomly, thereby defining a bingo card selected for evaluation. According to some embodiments, the method 600 may comprise selecting a line of the bingo card (e.g., selected at 608), at 610. In the case that the selected bingo card comprises multiple play lines (e.g., possible win-paths or matrix or array position combinations), one of the lines may be selected for evaluation. In the case that each line is identified by an assigned identifier (or sub-identifier, e.g., that has a root portion that comprises the identifier of the selected bingo card), for example, one of a plurality of available lines of the bingo card may be selected, e.g., sequentially or randomly, thereby defining a play line for evaluation.

According to some embodiments, the method 600 may comprise evaluating (e.g., by the processing device) the selected play line of the bingo card to determine a status or proximity to win condition, at 612. Each bingo card of the plurality of bingo cards for a particular player (and each play line thereof) may be analyzed, for example, to determine (i) how many win conditions the particular bingo card currently has, and/or (ii) what the state of those win conditions is. The first bingo card (continuing the example from above) having the four (4) out of the five (5) numbers in the given row daubed, for example, is only one (1) number away from a five-in-a-row win condition. In such a case, it may be determined that the first bingo card has a single win condition that is an "almost winning" condition, that is one (1) number away from a win, and/or may also or alternatively note any characteristics of the particular number remaining for the requirement (e.g., probabilities of being called, expected values, etc.). In some cases, a single bingo card may have multiple win conditions, such as a "1 away" in line/row one, a "2 away" in line/row two, and a "3 away" in line/row three.

In some embodiments, the evaluation may comprise a comparison of the symbols/numbers of the selected line to the most recently "called" number or all "active" (e.g., previously called in the same session) numbers. The comparison may comprise a determination of how many symbols/numbers along the selected line correspond to "active" numbers and/or how many symbols/numbers along the selected line fail to correspond to "active" numbers. According to some embodiments, the evaluation may comprise an identification of any winning conditions (e.g., more than a threshold number of symbols/numbers along the line have been "called") and/or an identification of a proximity to a win condition—e.g., one (1) number remaining in the line that has not yet been called and/or that, upon being called, will result in a winning condition for the line.

According to some embodiments, the method 600 may comprise determining (e.g., by the processing device) whether all play lines of the selected bingo card have been evaluated, at 614. In the case that all available lines have not yet been evaluated (e.g., it is determined that one or more lines have not yet been evaluated), the method 600 may loop back to select a new/next/different line to evaluate, at 610. In the case that all available lines of the card have been evaluated (e.g., it is determined that all lines have been evaluated), the method 600 may continue to determine (e.g., by the processing device) whether all issued bingo cards (e.g., for a particular player, player identifier, group, group identifier, etc.) have been evaluated, at 616. In the case that all available cards have not yet been evaluated (e.g., it is determined that one or more cards have not yet been evaluated), the method 600 may loop back to select a new/next/different card to evaluate, at 608. In the case that all available cards have been evaluated (e.g., it is determined that all cards have been evaluated), the method 600 may continue to sort (e.g., by the processing device) the lines of the issued cards based on the proximity to win conditions (e.g., evaluated or determined at 612), at 618.

In some embodiments for example, the plurality of determined win conditions (or proximity to win conditions or statuses) for the plurality of bingo cards (and/or lines thereof) for the player may be sorted, ranked, and/or grouped. The win conditions determined to currently exist with respect to the plurality of bingo cards for the player may, for example, be sorted in accordance with how close each condition/status is to an actual win event. Any "1 away" conditions may assigned a first sort position or rank, for example, with "2 away" conditions next, then "3 away", etc. According to some embodiments, an "activation time" of a proximity to win condition may also or alternatively be utilized for sorting. Within or amongst the "1 away" conditions, for example, the particular condition that occurred earliest may be ranked higher than more recent proximity to win conditions of the same type/status. In such a manner, for example, the most 'aged' conditions of a particular type (e.g., those that acquired the particular proximity to win condition at the earliest time) may be positioned higher in the sort order.

According to some embodiments, the method 600 may comprise modifying (e.g., by the processing device) the initial interface (e.g., with the sorted proximity to win conditions), at 620. A small screen form factor interface may, for example, be configured to provide output that indicates multiple positions of the sort order of sorted/ranked win conditions. As depicted in the example interface 920*b* of FIG. 9B, for example, multiple objects may be presented, one for each of the top rankings of the sort order. In some embodiments, since the sorting is bingo card agnostic (e.g., independent of bingo card identification), a single bingo card may be represented by a plurality of proximity to win condition sort order positions. In such a manner for example, a player may be easily able to view the most recent, closest proximity to win conditions, regardless of which bingo card they are on—and indeed, several may be on the same bingo card. In some embodiments, the modifying may comprise defining or selecting one or more graphical interface elements to represent one or more of the sorted proximity to win conditions. According to some embodiments, the interface elements may be selected or defined to fit within the particular display device of the remote player device and/or may be selected as a group to fit within the given display area. In the case that four (4) different lines of various bingo cards are more proximate to a win condition than a predetermined threshold (e.g., equal to or closer than "3 to win"), for example, the dimensions of the graphical elements representing the group of four (4) conditions (e.g., lines) may be sized to fit within the given display area, e.g., without requiring scrolling by the player to view all four (4) lines simultaneously. According to some embodiments, the threshold of proximity to win may be adjusted to provide for the top sorted conditions to be displayed—e.g., the top five (5) conditions may be displayed, regardless of particular proximity to win status.

In some embodiments, the method 600 may comprise outputting (e.g., by the processing device and/or via the electronic communications network device) the modified interface, at 622. The outputting may comprise, for example, transmitting one or more commands (and/or data items, such as data defining one or more graphical interface elements) from the central server device to the remote mobile player device. According to some embodiments, the commands may cause the remote mobile device to rearrange the displayed graphical elements such that the sorted and highest-ranked proximity to win conditions, e.g., representing each line of any bingo card that comprises such a proximity to win condition, are fit within the viewable display are of the remote mobile player device. In such a manner, for example, the graphical interface (e.g., game play interface) provided to the player may be dynamically reconfigured to position elements defining proximity to win conditions for various bingo card lines within the viewable area, e.g., regardless of or specifically taking into account the specific dimensions of the viewable area for the particular remote mobile player device. In other words, different mobile devices of different players, even in the case that the identical sorted proximity to win information is provided (which is not likely, but utilized for exemplary purposes herein), may receive different transmitted instructions defining different graphical elements and/or interface modifications based on the characteristics of each particular display device.

Figure 7:
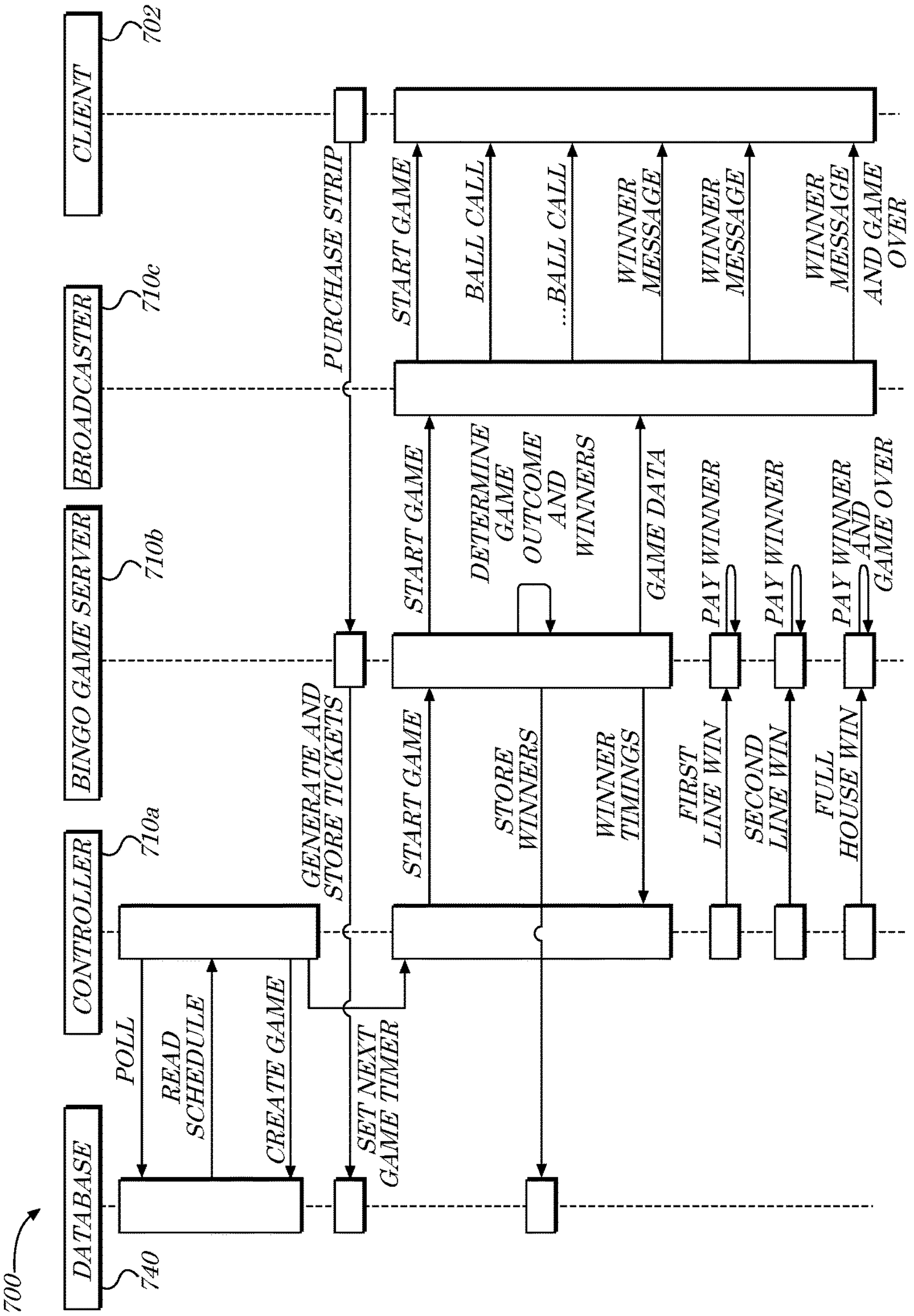
FIG. 7 is a flow diagram of a method according to some embodiments.

Referring now to FIG. 7, a flow diagram of a bingo-style game method 700 according to some embodiments is shown. The bingo-style game method 700, in accordance with some embodiments, may comprise transfer, transmittal, passing, exchanging, and/or providing of data between one or more of a client 702, a controller 710*a*, a bingo game server 710*b*, a broadcaster 710*c*, and/or a database 740. As depicted in FIG. 7, the client device 702 of a player may initiate (e.g., via a gaming website) a purchase of one or more bingo game tickets (and/or strips, blocks, or sets thereof) from the bingo game server 710*b*. The bingo game server 710*b* may then generate and store tickets (e.g., ticket identifiers) for the player in the database 740. According to some embodiments, the bingo game server 710*b* may transmit interface commands to the client device 702 (e.g., via the broadcaster 710*c*) to cause the client device 702 to display initial representations of the purchased/issued tickets.

In some embodiments, as depicted in the bingo-style game method 700, the database 740 may be in communication with the controller 710*a*. The controller 710*a* may, for example, poll the database 740 for a gaming schedule stored in the database 740, and read a schedule provided by the controller 710*a*. Based on this information, the controller 710*a* may then create a game which may, in turn, be stored by the database 740.

In one or more embodiments, a player's gaming experience may or may not be affected by game data which may include, for example, the player's game play history (e.g., stored in the database 740). For example, the database 740 may store information concerning game winners (e.g., buy-in amounts, wagers, and/or appropriate bingo card/ticket/players-specific paytables), and may send this information to the bingo game server 710*b*, which may then use this data to affect the game in one or more ways. The bingo game server 710*b*, in some embodiments, may send game data to the broadcaster 710*c* to control what is broadcast to the client device 702 (e.g., based on how the bingo game server 710*b* may have altered and/or defined the game). In some embodiments, the bingo game server 710*b* affects both game data (e.g., results) and winner timings based on data stored in the database 740.

In some embodiments, once a game is created, the controller 710*a* may set a timer to determine when the next game should begin. Once the game is scheduled to begin, the controller 710*a* may, in some examples, communicate with the bingo game server 710*b* to begin game play. The bingo game server 710*b* then preferably communicates with the broadcaster 710*c* to begin game play. The broadcaster 710*c*, in turn, broadcasts the started game to the client 702. Once game play is initiated, the broadcaster 710*c* may communicate with the client device 702 directly. According to some embodiments, the client device 702 may comprise, without limitation, a player's tablet computer, desktop computer, or mobile device. As depicted with respect to functions of the bingo-style game method 700, the broadcaster 710*c* may, for example, communicate a plurality of ball calls (e.g., outcomes defined by one or more RNG outputs) in real time, proximity to win messages and/or interface commands (e.g., commands to condense an interface display listing of proximity to win conditions on a mobile device output screen), present winner messages (if applicable), and provide "game over" signals. In one or more embodiments, the game outcome, results, and/or winners may be determined by the bingo game server 710*b*. In some embodiments, for example, the controller 710*a* may alert the bingo game server 710*b* as to the end of game play (e.g., upon the completion of the first line, second line, and full house winners), and the bingo game server 710*b* facilitates payment of the winners (e.g., by initiating the transfer of winnings to a player accounts). According to some embodiments, the bingo game server 710*b* determines how much to pay a winning player based on a particular buy-in amount associated (e.g., via a stored representation and/or data record in the database 740) with a particular winning bingo card, ticket, sheet, and/or player.

V. Modified General Purpose Systems

Figure 8:
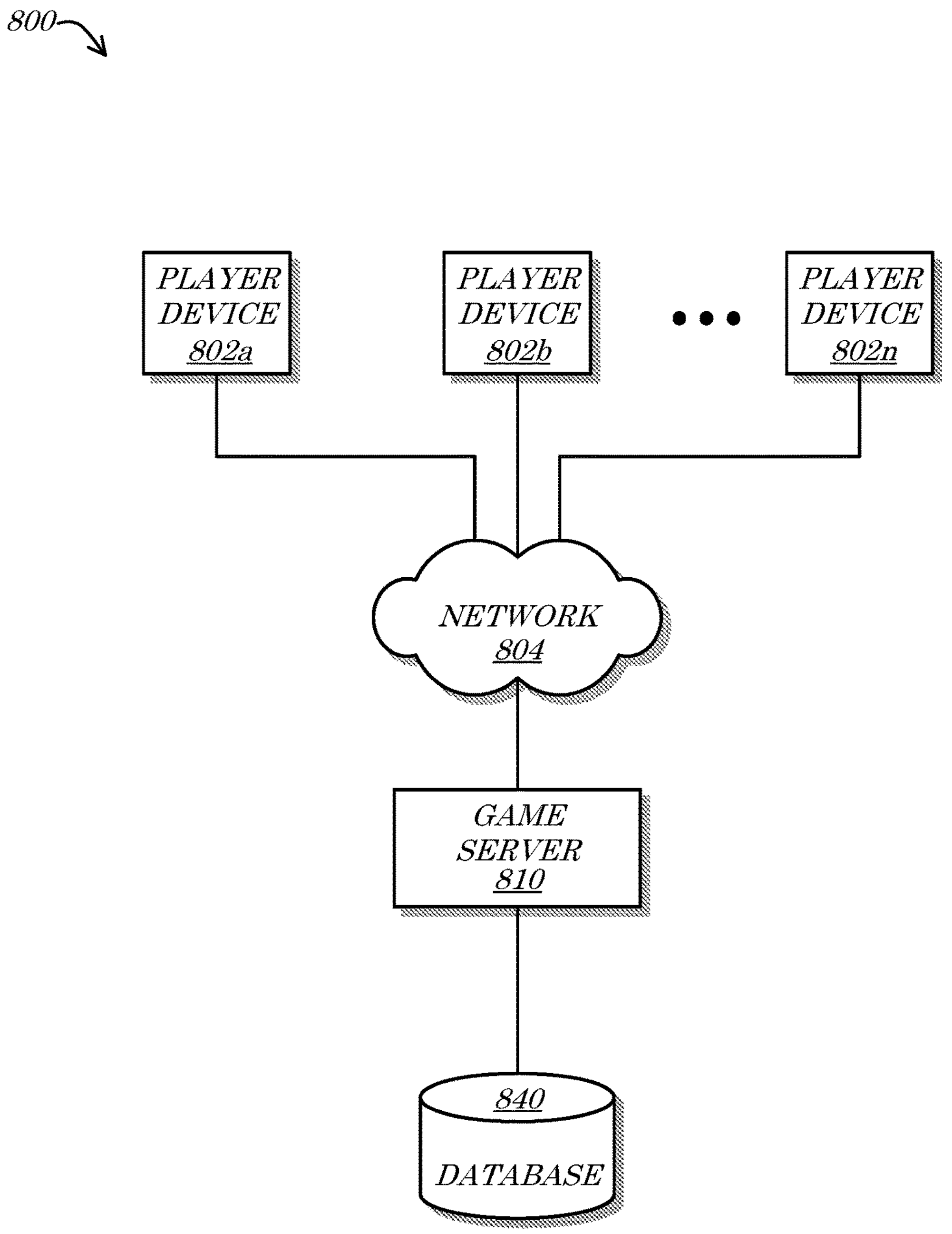
FIG. 8 is a block diagram of a system according to some embodiments.

Referring to FIG. 8, a block diagram of a system 800 according to some embodiments is shown. In some embodiments, the system 800 may comprise a gaming platform such as a gaming platform via which one or more multi-player and/or online games may be played (e.g., one or more bingo-style games as described herein). In some embodiments, the system 800 may comprise a general purpose computer system that is modified to perform, conduct, and/or facilitate embodiments described herein. The system 800 may comprise, for example, a plurality of player devices 802*a-n* in communication with and/or via a network 804. In some embodiments, a game server 810 may be in communication with the network 804 and/or one or more of the player devices 802*a-n*. In some embodiments, the game server 810 (and/or the player devices 802*a-n*) may be in communication with a database 840. The database 840 may store, for example, game data (e.g., processed and/or defined by the game server 810), data associated with players (not explicitly shown) owning and/or operating the player devices 802*a-n*, and/or instructions that cause various devices (e.g., the game server 810 and/or the player devices 802*a-n*) to operate in accordance with embodiments described herein.

According to some embodiments, any or all of the components 802*a-n*, 804, 810, 840 of the system 800 may be similar in configuration and/or functionality to any similarly named and/or numbered components described herein. Fewer or more components 802*a-n*, 804, 810, 840 (and/or portions thereof) and/or various configurations of the components 802*a-n*, 804, 810, 840 may be included in the system 800 without deviating from the scope of embodiments described herein. While multiple instances of some components 802*a-n* are depicted and while single instances of other components 804, 810, 840 are depicted, for example, any component 802*a-n*, 804, 810, 840 depicted in the system 800 may comprise a single device, a combination of devices and/or components 802*a-n*, 804, 810, 840, and/or a plurality of devices, as is or becomes desirable and/or practicable. Similarly, in some embodiments, one or more of the various components 802*a-n*, 804, 810, 840 may not be needed and/or desired in the system 800.

The player devices 802*a-n*, in some embodiments, may comprise any type or configuration of electronic, mobile electronic, and or other network and/or communication devices (or combinations thereof) that are or become known or practicable. A first player device 802*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 802*a-n* may be specifically utilized and/or configured (e.g., via specially-programmed and/or stored instructions such as may define or comprise a software application) to communicate with the game server 810 (e.g., via the network 804).

The network 804 may, according to some embodiments, comprise a LAN, WAN, cellular telephone network, Bluetooth® network, NFC network, and/or RF network with communication links between the player devices 802*a-n*, the game server 810, and/or the database 840. In some embodiments, the network 804 may comprise direct communications links between any or all of the components 802*a-n*, 810, 840 of the system 800. The game server 810 may, for example, be directly interfaced or connected to the database 840 via one or more wires, cables, wireless links, and/or other network components, such network components (e.g., communication links) comprising portions of the network 804. In some embodiments, the network 804 may comprise one or many other links or network components other than those depicted in FIG. 8. A second player device 802*b* may, for example, be connected to the game server 810 via various cell towers, routers, repeaters, ports, switches, and/or other network components that comprise the Internet and/or a cellular telephone (and/or Public Switched Telephone Network (PSTN)) network, and which comprise portions of the network 804.

While the network 804 is depicted in FIG. 8 as a single object, the network 804 may comprise any number, type, and/or configuration of networks that is or becomes known or practicable. According to some embodiments, the network 804 may comprise a conglomeration of different sub-networks and/or network components interconnected, directly or indirectly, by the components 802*a-n*, 810, 840 of the system 800. The network 804 may comprise one or more cellular telephone networks with communication links between the player devices 802*a-n* and the game server 810, for example, and/or may comprise the Internet (and/or a portion thereof), with communication links between the player devices 802*a-n* and the database 840, for example.

According to some embodiments, the game server 810 may comprise a device (and/or system) owned and/or operated by or on behalf of or for the benefit of a game provider (not explicitly shown). The game provider may utilize player and/or game information or instructions (e.g., stored by the database 840), in some embodiments, to host, manage, analyze, design, define, price, conduct, and/or otherwise provide (or cause to be provided) one or more games such as online multiplayer games (e.g., one or more bingo-style games as described herein). In some embodiments, the game provider (and/or a third-party; not explicitly shown) may provide an interface (not shown in FIG. 8) to and/or via the player devices 802*a-n*. The interface may be configured, according to some embodiments, to allow and/or facilitate electronic game play by one or more players. In some embodiments, the system 800 (and/or interface provided by the game server 810) may present game data (e.g., from the database 840) in such a manner that allows players to participate in one or more online games (singularly, in/with groups, and/or otherwise). According to some embodiments, the game server 810 may cause and/or facilitate various functionality and/or features of one or more bingo-style games, e.g., via the interface as-modified to accommodate a mobile device screen form-factor, each as described herein.

In some embodiments, the database 840 may comprise any type, configuration, and/or quantity of data storage devices that are or become known or practicable. The database 840 may, for example, comprise an array of optical and/or solid-state hard drives configured to store player and/or game data, and/or various operating instructions, drivers, etc. While the database 840 is depicted as a stand-alone component of the system 800 in FIG. 8, the database 840 may comprise multiple components. In some embodiments, a multi-component database 840 may be distributed across various devices and/or may comprise remotely dispersed components. Any or all of the player devices 802*a-n* may comprise the database 840 or a portion thereof, for example, and/or the game server 810 may comprise the database 840 or a portion thereof.

According to some embodiments, any or all of the player devices 802*a-n* in conjunction with one or more of the game server 810 and/or the database 840 (e.g., via the network 804) may conduct (in whole or in part), facilitate, and/or otherwise be associated with execution of one or more stored procedures, applications, processes, and/or methods (e.g., the methods 600, 700 of FIG. 6 and/or FIG. 7 herein, and/or one or more combinations and/or portions thereof) as described herein.

VI. Interfaces and Interface Modifications

Figure 9A:
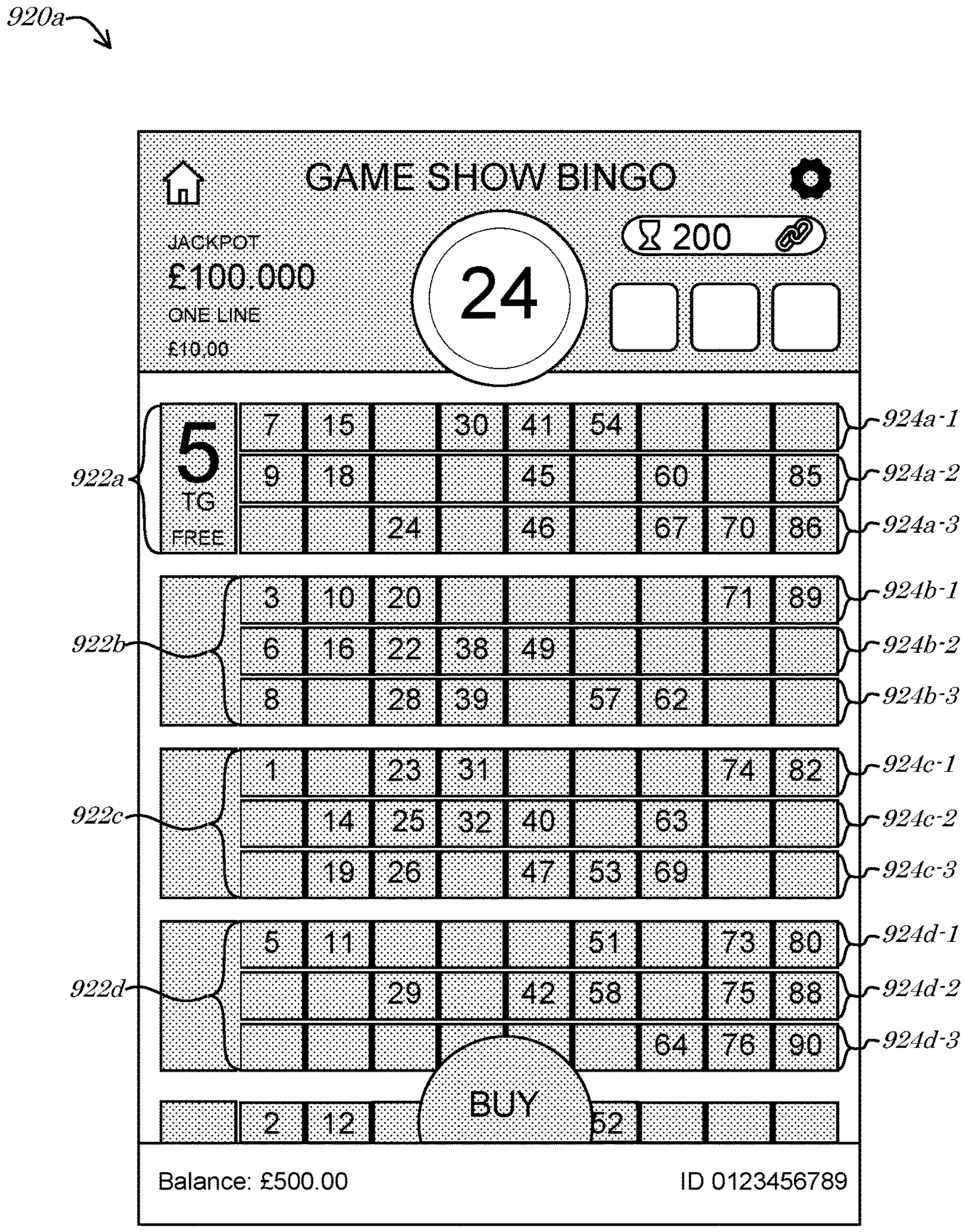
FIG. 9A and FIG. 9B are diagrams of example interfaces according to some embodiments.
Figure 9B:
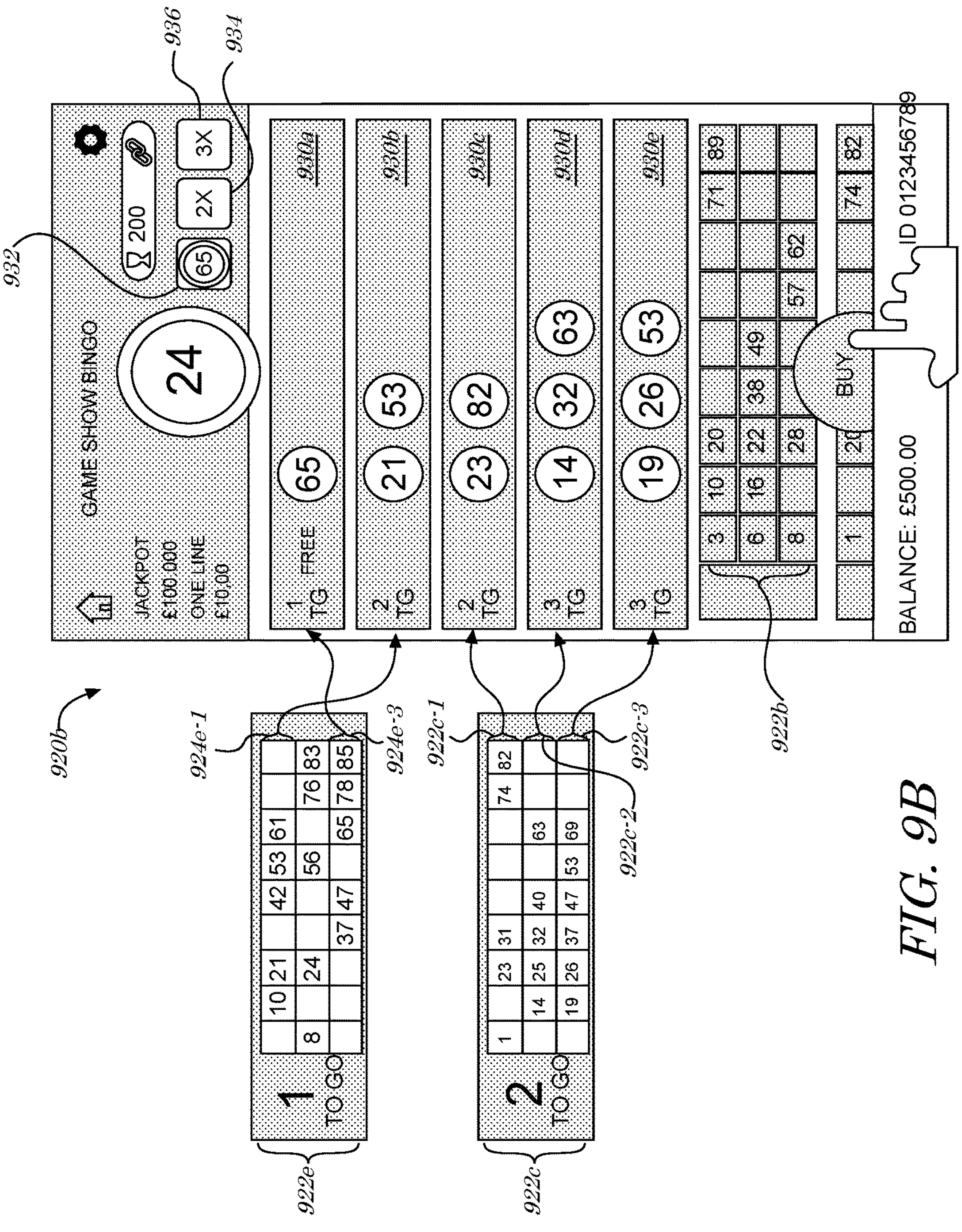

Turning now to FIG. 9A and FIG. 9B, example interfaces 920*a-b* according to some embodiments are shown. In some embodiments, the interfaces 920*a-b* may comprise one or more of a web page, web form, database entry form, API, spreadsheet, table, and/or application or other GUI via which a player may interact with (e.g., setup and/or play) a bingo-style game as described herein. The interfaces 920*a-b* may, for example, comprise a front-end of an online, social, network, and/or wagering game program (and/or portion thereof) and/or platform programmed and/or otherwise configured to execute, conduct, and/or facilitate the methods 600, 700 of FIG. 6 and/or FIG. 7 herein, and/or one or more portions and/or combinations thereof. In some embodiments, the interfaces 920*a-b* may be output via a computerized device (e.g., a processor or processing device) such as one or more of the player and/or user devices 102*a-b*, 202*a-n*, 302*a-b*, 402, 502, 802*a-n* and/or the servers, apparatus, and/or controller devices 110*a-f*, 210*a-n*, 310*a-g*, 410*e-f*, 510*a-j*, 810, 1010 of FIG. 1, FIG. 2, FIG. 3, FIG. 4, FIG. 5, FIG. 8, and/or FIG. 10 herein. In some embodiments, the example interfaces 920*a-b* may comprise interface outputs of (and/or otherwise associated with) a GUI utilized to conduct and/or play a bingo-style game, such as may be implemented and/or provided as described herein.

In some embodiments, a first example interface 920*a* may present or provide output indicative of multiple bingo cards 922*a-d*. According to some embodiments, each bingo card 922*a-d* may comprise a plurality of rows or sets of numbers or symbols, e.g., "play lines" 924*a-d*. As depicted for example, a first bingo card 922*a* may comprise a first play line 924*a*-1, a second play line 924*a*-2, and/or a third play line 924*a*-3, a second bingo card 922*b* may comprise a first play line 924*b*-1, a second play line 924*b*-2, and/or a third play line 924*b*-3, a third bingo card 922*c* may comprise a first play line 924*c*-1, a second play line 924*c*-2, and/or a third play line 924*c*-3, and/or a fourth bingo card 922*d* may comprise a first play line 924*a*-1, a second play line 924*a*-2, and/or a third play line 924*a*-3. The presentation via the interface 920*a* may generally be referred to herein as a "standard" or "original", initial, or first mobile device bingo-style game interface presentation. Such a presentation via the first interface 920*a*, for example, allows the player to view each number position of each play line 924*a-d* of each of the bingo cards 922*a-d*. In some embodiments, additional bingo cards (not shown) may be accessible such as by "swiping" the first interface 920*a* to scroll through all active or available bingo cards accessible to the player. In other words, the initial or first interface 920*a* may be formatted to include and/or fit a subset of all available (e.g., purchased or active) bingo cards 922*a-d* for a given player (or group or team). According to some embodiments, the first interface 920*a* of FIG. 9A may be displayed to a player after purchase of the bingo cards 922*a-d* but prior to initiation of game play. In some embodiments, the first interface 920*a* of FIG. 9A may be displayed or otherwise output prior to a determination (e.g., an identification) of a proximity to win condition for any of the bingo cards 922*a-d* or prior to any of the bingo cards 922*a-d* attaining a predetermined threshold of proximity to a win condition (e.g., better than four (4) to go to win).

According to some embodiments, a second example interface 920*b* may provide a modified or simplified view that primarily provides the player with a plurality of proximity to win condition banners 930*a-e* (e.g., as opposed to displays of actual bingo cards 922*a-d*). The win conditions determined and/or sorted or ranked in the method 600 of FIG. 6 herein, for example, may be output to the player via the second example interface 920*b*, providing the player with an enhanced view of possible or likely winning conditions for all bingo cards 922*a-d* that are active for the player. In some embodiments, a fifth bingo card 922*e* (e.g., not displayed on the visible screen are of the first interface 920*a* of FIG. 9A) may comprise a "1 to go" proximity to win condition, such as in a third row or play line 924*e*-3 thereof, where only the number sixty-five (65) is required to achieve a winning condition (e.g., five (5) adjacent called numbers). Such first proximity to win condition may be represented by a first one of the proximity to win condition banners 930*a*, which shows "1 TG" for one-to-go as well as the required number to achieve the win condition. The fifth bingo card 922*e* may also, in some embodiments, comprise a "2 to go" proximity to win condition, such as in a first row or play line 924*e*-1 thereof where both a twenty-three (23) and a fifty-three (53) are required to achieve a win condition. Such second proximity to win condition may be represented by a second one of the proximity to win condition banners 930*b*, which shows "2 TG" for two-to-go as well as the numbers required to achieve the win condition. In such a manner, for example, multiple proximity to win condition banners 930*a-b* (and/or win conditions) may be displayed with respect to a single active bingo card 922*a-e*—i.e., the fifth bingo card 922*e*. Similarly, in accordance with some embodiments as shown in FIG. 9B, the third bingo card 922*c* may be represented by three (3) proximity to win condition banners 930*c-e*, each one representing a proximity to win condition that is currently active on the third bingo card 922*c*. A first play line 922*c*-1 of the third bingo card 922*c* may comprise (or define) a one-to-go proximity to wind condition, for example, a second play line 922*c*-2 of the third bingo card 922*c* may comprise (or define) a (e.g., first) two-to-go proximity to wind condition, and/or a third play line 922*c*-3 of the third bingo card 922*c* may comprise (or define) a (e.g., second) two-to-go proximity to wind condition.

According to some embodiments, as depicted in FIG. 9B, each of the five (5) proximity to win conditions (e.g., that meet a predetermined minimum proximity to win, such as three-to-go or better) may be represented on the second interface 920*b* by respective proximity to win condition banners 930*a-e*, and in some embodiments, the second bingo card 922*b* may also be represented. According to some embodiments, all proximity to win conditions that meet the threshold requirement may be represented by proximity to win condition banners 930*a-e* in the second interface 920*b*. In some embodiments, output screen characteristics (e.g., pixels, dimensions) may be compared to a number of qualifying proximity to win conditions to determine sizing information for proximity to win condition banners 930*a-e* for display. The total number of available pixels, inches, etc. in one or more directions (e.g., vertical or portrait screen dimension) may be divided by the number of qualifying proximity to win conditions, for example, to determine a maximum dimension for the proximity to win banners 930*a-e* in the one or more directions. In some embodiments, such as in the case that the maximum available dimensional length is calculated to be greater than a standard length, the standard length dimension may be utilized. In the case that the maximum available dimensional length is determined to be less than a standard length, the maximum available dimensional length may be utilized for one or more of the proximity to win condition banners 930*a-e*. In such a manner, for example, all proximity to win conditions above the predetermined threshold level of proximity to winning may be dynamically sized for display on various types of mobile device output screens, e.g., within available "real estate" constraints for each particular device. According to some embodiments, such as shown in FIG. 9B, the total number of qualifying (or existing) proximity to win conditions may only require proximity to win condition banners 930*a-e* that occupy a portion (e.g., subset) of the available output area of a display screen for the second interface 920*b*, and the second bingo card 922*b* (and/or other objects) may be displayed to fill the remaining space.

In some embodiments, the second interface 920*b* may comprise a one-to-go summary element 932, a two-to-go summary element 934, and/or a three-to-go summary element 936. The summary elements 932, 934, 936 may, for example, further summarize the information depicted by the proximity to win banners 930*a-e*. The one-to-go summary element 932 may, for example, depict the one (1) number/symbol remaining for the single "1 to go" proximity to win condition of the fifth bingo card 922*e* (i.e., of the third play line 924*e*-3 thereof), such that the player may quickly and easily view which number is required for the one-to-go scenario. In some embodiments, the two-to-go summary element 934 may provide a "2×" indicator representing the fact that there are two (2) active two-to-go proximity to win conditions and/or the three-to-go summary element 936 may provide a "3×" indicator representing the fact that there are three (3) active three-to-go proximity to win conditions.

While various components of the example interfaces 920*a-b* have been depicted with respect to certain labels, layouts, headings, titles, graphics, and/or configurations, these features have been presented for reference and example only. Other labels, layouts, headings, titles, and/or configurations (e.g., bingo numbers, proximity to win conditions, etc.) may be implemented without deviating from the scope of embodiments herein. Similarly, while a certain number of tabs, information screens, form fields, buttons, and/or data entry options have been presented, variations thereof may be practiced in accordance with some embodiments.

VII. Apparatus and Article of Manufacture

Figure 10:
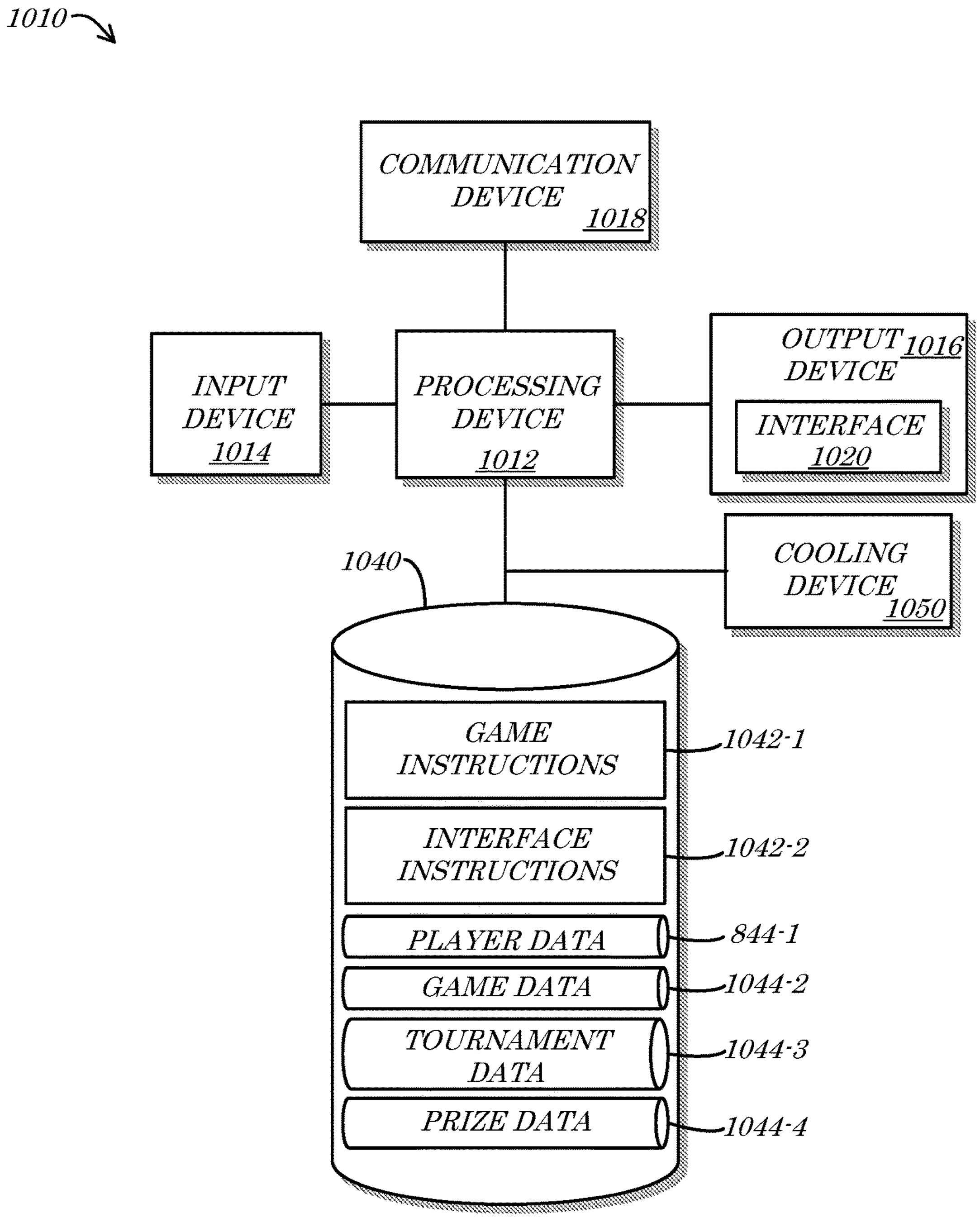
FIG. 10 is a block diagram of an apparatus according to some embodiments.
Figure 11A:
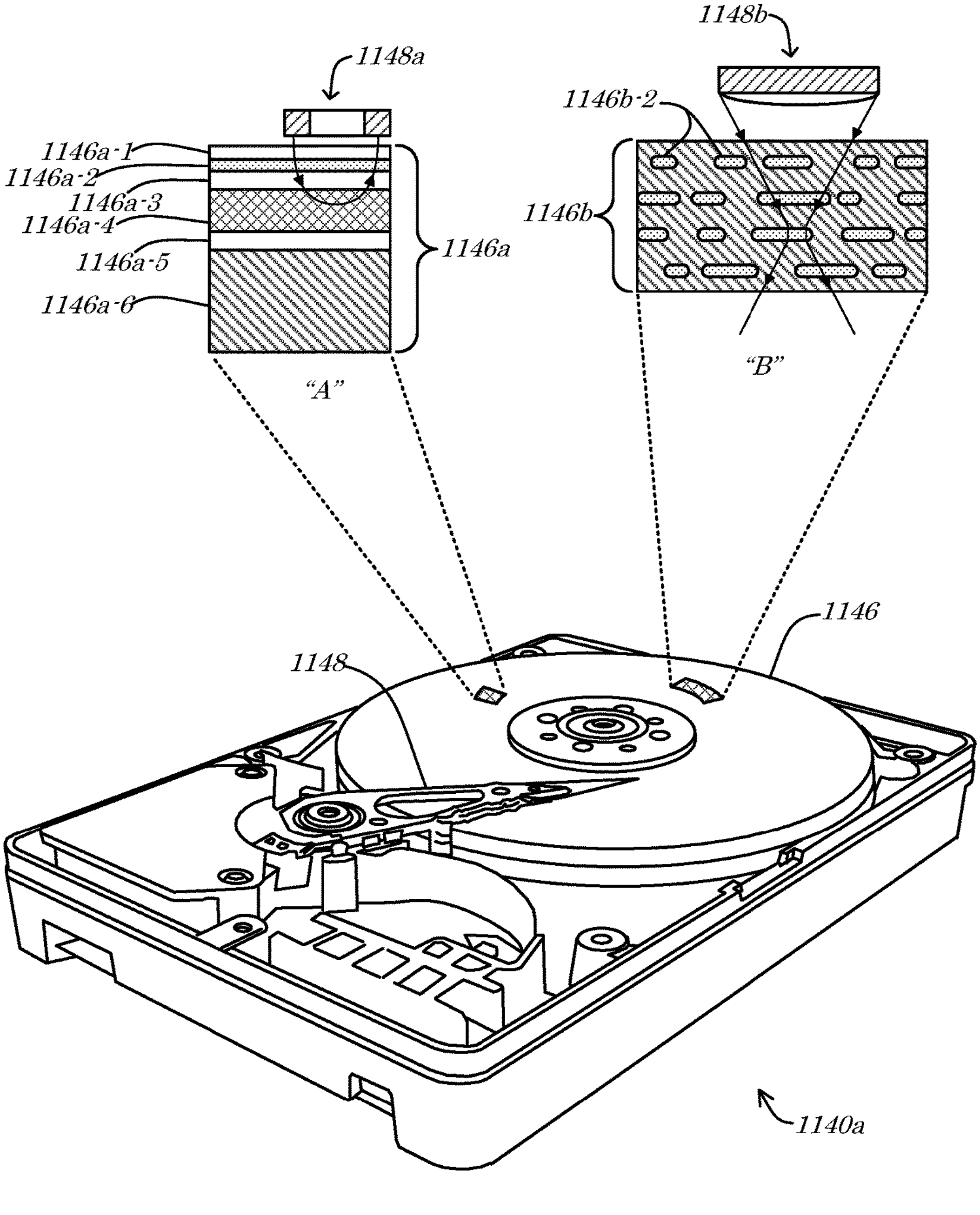
FIG. 11A, FIG. 11B, FIG. 11C, FIG. 11D, and FIG. 11E are perspective diagrams of exemplary data storage devices according to some embodiments.
Figure 11B:
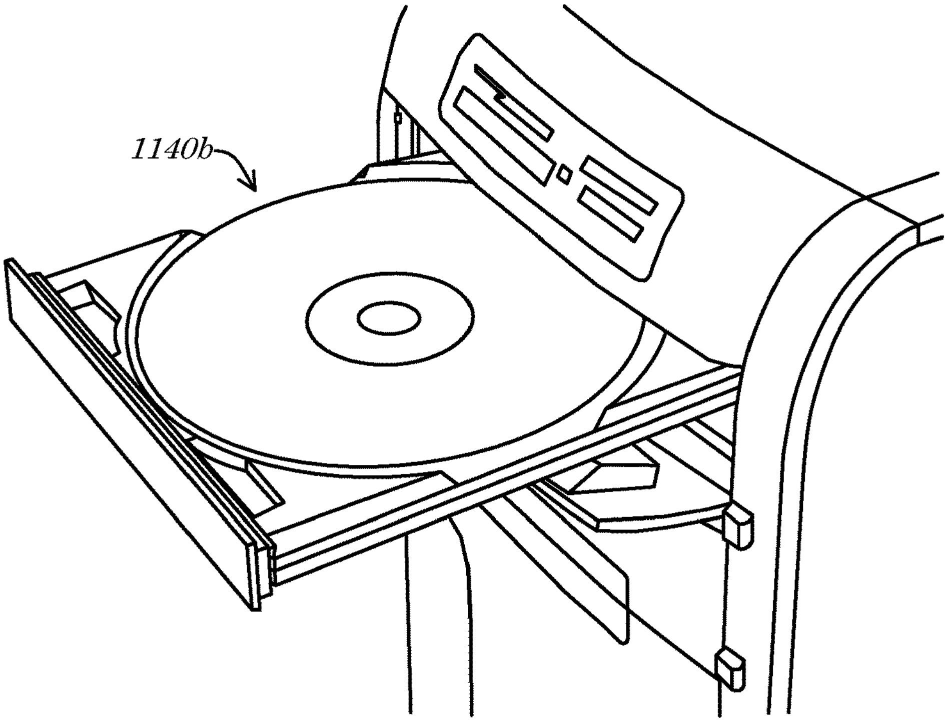
Figure 11C:
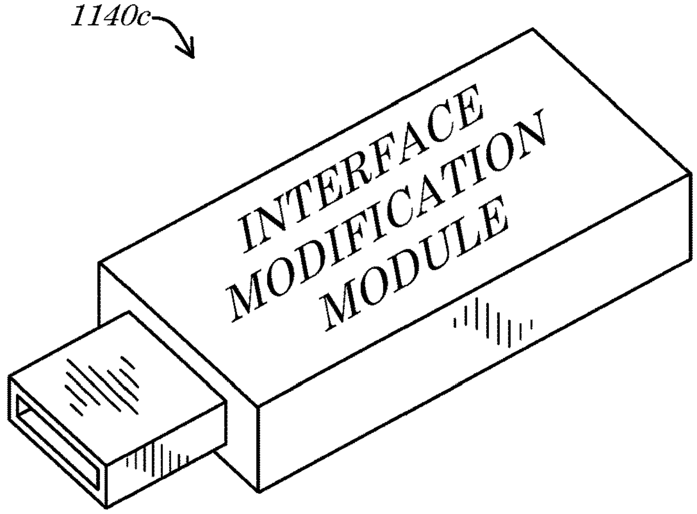
Figure 11D:
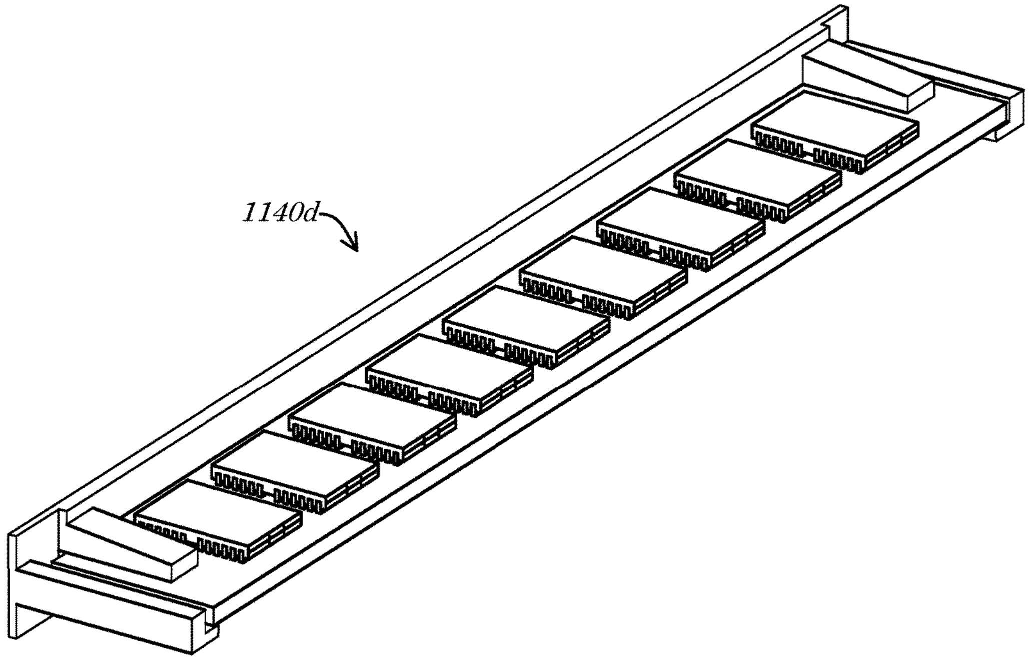
Figure 11E:
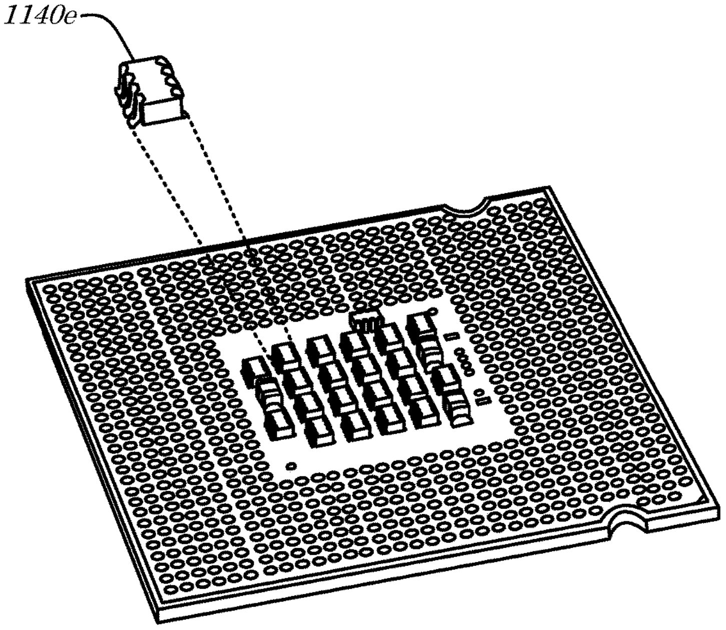

Turning to FIG. 10, a block diagram of an apparatus 1010 according to some embodiments is shown. In some embodiments, the apparatus 1010 may be similar in configuration and/or functionality to any of the player and/or user devices 102*a-b*, 202*a-n*, 302*a-b*, 402, 502, 802*a-n* and/or the servers and/or controller devices 110*a-f*, 210*a-n*, 310*a-g*, 410*e-f*, 510*a-j* of FIG. 1, FIG. 2, FIG. 3, FIG. 4, FIG. 5, and/or FIG. 8 herein, and/or may otherwise comprise a portion of the systems 100, 200, 300, 400, 500, 800 of FIG. 1, FIG. 2, FIG. 3, FIG. 4, FIG. 5, and/or FIG. 8 herein. The apparatus 1010 may, for example, execute, process, facilitate, and/or otherwise be associated with the methods 600, 700 of FIG. 6 and/or FIG. 7 herein, and/or one or more portions and/or combinations thereof. In some embodiments, the apparatus 1010 may comprise a processing device 1012, an input device 1014, an output device 1016, a communication device 1018, an interface 1020, a memory device 1040 (storing various programs and/or instructions 1042 and data 1044), and/or a cooling device 1050. According to some embodiments, any or all of the components 1012, 1014, 1016, 1018, 1020, 1040, 1042, 1044, 1050 of the apparatus 1010 may be similar in configuration and/or functionality to any similarly named and/or numbered components described herein. Fewer or more components 1012, 1014, 1016, 1018, 1020, 1040, 1042, 1044, 1050 and/or various configurations of the components 1012, 1014, 1016, 1018, 1020, 1040, 1042, 1044, 1050 be included in the apparatus 1010 without deviating from the scope of embodiments described herein.

According to some embodiments, the processing device 1012 may be or include any type, quantity, and/or configuration of electronic and/or computerized processor that is or becomes known. The processing device 1012 may comprise, for example, an Intel® IXP 2800 network processor or an Intel® XEON™ Processor coupled with an Intel® E7501 chipset. In some embodiments, the processing device 1012 may comprise multiple inter-connected processors, microprocessors, and/or micro-engines. According to some embodiments, the processing device 1012 (and/or the apparatus 1010 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 1010 comprises a server such as a blade server, necessary power may be supplied via a standard AC outlet, power strip, surge protector, a PDU, and/or Uninterruptible Power Supply (UPS) device.

In some embodiments, the input device 1014 and/or the output device 1016 are communicatively coupled to the processing device 1012 (e.g., via wired and/or wireless connections and/or pathways) and they may generally comprise any types or configurations of input and output components and/or devices that are or become known, respectively. The input device 1014 may comprise, for example, a keyboard that allows an operator of the apparatus 1010 to interface with the apparatus 1010 (e.g., by a player, such as to participate in a bingo-style game as described herein). In some embodiments, the input device 1014 may comprise a sensor configured to provide information such as player input to the apparatus 1010 and/or the processing device 1012. The output device 1016 may, according to some embodiments, comprise a display screen and/or other practicable output component and/or device. The output device 1016 may, for example, provide the interface 1020 to a player (e.g., via a website and/or electronic communications network device). According to some embodiments, the input device 1014 and/or the output device 1016 may comprise and/or be embodied in a single device such as a touch-screen monitor (e.g., a device capable of both receiving input and providing output).

In some embodiments, the communication device 1018 may comprise any type or configuration of communication device that is or becomes known or practicable. The communication device 1018 may, for example, comprise a Network Interface Card (NIC), a telephonic device, a cellular network device, a router, a hub, a modem, and/or a communications port or cable. In some embodiments, the communication device 1018 may be coupled to provide data to a player device (not shown in FIG. 10), such as in the case that the apparatus 1010 is utilized to provide the interface 1020 to a player as described herein. The communication device 1018 may, for example, comprise a cellular telephone network transmission device that sends signals indicative of game interface components to customer and/or subscriber handheld, mobile, and/or telephone device. According to some embodiments, the communication device 1018 may also or alternatively be coupled to the processing device 1012. In some embodiments, the communication device 1018 may comprise an IR, RF, Bluetooth™, NFC, and/or Wi-Fi® network device coupled to facilitate communications between the processing device 1012 and another device (such as a player device and/or a third-party device).

The memory device 1040 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 1040 may, according to some embodiments, store one or more of game instructions 1042-1, interface instructions 1042-2, player data 1044-1, game data 1044-2, tournament data 1044-3, and/or prize data 1044-4. In some embodiments, the game instructions 1042-1, interface instructions 1042-2, player data 1044-1, game data 1044-2, tournament data 1044-3, and/or prize data 1044-4 may be utilized by the processing device 1012 to provide output information via the output device 1016 and/or the communication device 1018.

According to some embodiments, the game instructions 1042-1 may be operable to cause the processing device 1012 to process player data 1044-1, game data 1044-2, tournament data 1044-3, and/or prize data 1044-4. Player data 1044-1, game data 1044-2, tournament data 1044-3, and/or prize data 1044-4 received via the input device 1014 and/or the communication device 1018 may, for example, be analyzed, sorted, filtered, decoded, decompressed, ranked, scored, plotted, and/or otherwise processed by the processing device 1012 in accordance with the game instructions 1042-1. In some embodiments, player data 1044-1, game data 1044-2, tournament data 1044-3, and/or prize data 1044-4 may be fed by the processing device 1012 through one or more mathematical and/or statistical formulas and/or models in accordance with the game instructions 1042-1 to provide bingo-style games having features and/or functionality in accordance with embodiments described herein.

In some embodiments, the interface instructions 1042-2 may be operable to cause the processing device 1012 to process player data 1044-1, game data 1044-2, tournament data 1044-3, and/or prize data 1044-4. Player data 1044-1, game data 1044-2, tournament data 1044-3, and/or prize data 1044-4 received via the input device 1014 and/or the communication device 1018 may, for example, be analyzed, sorted, filtered, decoded, decompressed, ranked, scored, plotted, and/or otherwise processed by the processing device 1012 in accordance with the interface instructions 1042-2. In some embodiments, player data 1044-1, game data 1044-2, tournament data 1044-3, and/or prize data 1044-4 may be fed by the processing device 1012 through one or more mathematical and/or statistical formulas and/or models in accordance with the interface instructions 1042-2 to provide the interface 1020 which may comprise, for example, one or more game interfaces configured to (e.g., specially-programmed to) provide bingo-style games having functionality in accordance with embodiments described herein.

Any or all of the exemplary instructions and data types described herein and other practicable types of data may be stored in any number, type, and/or configuration of memory devices that is or becomes known. The memory device 1040 may, for example, comprise one or more data tables or files, databases, table spaces, registers, and/or other storage structures. In some embodiments, multiple databases and/or storage structures (and/or multiple memory devices 1040) may be utilized to store information associated with the apparatus 1010. According to some embodiments, the memory device 1040 may be incorporated into and/or otherwise coupled to the apparatus 1010 (e.g., as shown) or may simply be accessible to the apparatus 1010 (e.g., externally located and/or situated).

In some embodiments, the apparatus 1010 may comprise the cooling device 1050. According to some embodiments, the cooling device 1050 may be coupled (physically, thermally, and/or electrically) to the processing device 1012 and/or to the memory device 1040. The cooling device 1050 may, for example, comprise a fan, heat sink, heat pipe, radiator, cold plate, and/or other cooling component or device or combinations thereof, configured to remove heat from portions or components of the apparatus 1010.

Referring now to FIG. 11A, FIG. 11B, FIG. 11C, FIG. 11D, and FIG. 11E, perspective diagrams of exemplary data storage devices 1140*a-e* according to some embodiments are shown. The data storage devices 1140*a-e* may, for example, be utilized to store instructions and/or data such as the game instructions 1042-1, interface instructions 1042-2, player data 1044-1, game data 1044-2, tournament data 1044-3, and/or prize data 1044-4, each of which is described in reference to FIG. 10 herein. In some embodiments, instructions stored on the data storage devices 1140*a-e* may, when executed by a processor, cause the implementation of and/or facilitate the methods 600, 700 of FIG. 6 and/or FIG. 7 herein, and/or portions and/or combinations thereof.

According to some embodiments, the first data storage device 1140*a* may comprise one or more various types of internal and/or external hard drives. The first data storage device 1140*a* may, for example, comprise a data storage medium 1146 that is read, interrogated, and/or otherwise communicatively coupled to and/or via a disk reading device 1148. In some embodiments, the first data storage device 1140*a* and/or the data storage medium 1146 may be configured to store information utilizing one or more magnetic, inductive, and/or optical means (e.g., magnetic, inductive, and/or optical-encoding). The data storage medium 1146, depicted as a first data storage medium 1146*a* for example (e.g., breakout cross-section "A"), may comprise one or more of a polymer layer 1146*a*-1, a magnetic data storage layer 1146*a*-2, a non-magnetic layer 1146*a*-3, a magnetic base layer 1146*a*-4, a contact layer 1146*a*-5, and/or a substrate layer 1146*a*-6. According to some embodiments, a magnetic read head 1146*a* may be coupled and/or disposed to read data from the magnetic data storage layer 1146*a*-2.

In some embodiments, the data storage medium 1146, depicted as a second data storage medium 1146*b* for example (e.g., breakout cross-section "B"), may comprise a plurality of data points 1146*b*-2 disposed with the second data storage medium 1146*b*. The data points 1146*b*-2 may, in some embodiments, be read and/or otherwise interfaced with via a laser-enabled read head 1148*b* disposed and/or coupled to direct a laser beam through the second data storage medium 1146*b*.

In some embodiments, the second data storage device 1140*b* may comprise a CD, CD-ROM, DVD, Blu-Ray™ Disc, and/or other type of optically-encoded disk and/or other storage medium that is or becomes known or practicable. In some embodiments, the third data storage device 1140*c* may comprise a USB keyfob, dongle, and/or other type of flash memory data storage device that is or becomes know or practicable. In some embodiments, the fourth data storage device 1140*d* may comprise RAM of any type, quantity, and/or configuration that is or becomes practicable and/or desirable. In some embodiments, the fourth data storage device 1140*d* may comprise an off-chip cache such as a Level 2 (L2) cache memory device. According to some embodiments, the fifth data storage device 1140*e* may comprise an on-chip memory device such as a Level 1 (L1) cache memory device.

The data storage devices 1140*a-e* may generally store program instructions, code, and/or modules that, when executed by a processing device cause a particular machine to function in accordance with one or more embodiments described herein. The data storage devices 1140*a-e* depicted in FIG. 11A, FIG. 11B, FIG. 11C, FIG. 11D, and FIG. 11E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an game provider may, for example, comprise various specialized computers that interact to provide for bingo-style games as described herein.

VIII. Rules of Interpretation

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided herein, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an "alternate", "alternative", and/or "alternate embodiment" is intended to connote one or more possible variations—not mutual exclusivity. In other words, it is expressly contemplated that "alternatives" described herein may be utilized and/or implemented together, unless they inherently are incapable of being utilized together.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference, unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". In some embodiments, a first thing being "based on" a second thing refers specifically to the first thing taking into account the second thing in an explicit manner. In such embodiments, for example, a processing step based on the local weather, which itself is in some manner based on or affected by (for example) human activity in the rainforests, is not "based on" such human activities because it is not those activities that being explicitly analyzed, included, taken into account, and/or processed.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "wherein", as utilized herein, does not evidence intended use. The term "wherein" expressly refers to one or more features inclusive in a particular embodiment and does not imply or include an optional or conditional limitation.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein. According to some embodiments, a "processor" may primarily comprise and/or be limited to a specific class of processors referred to herein as "processing devices". "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. § 101.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

IX. Computerized Processing

Various embodiments described herein provide advantages in computer processing. The number of online gaming transactions that can effectively be input, processed, and output in accordance with embodiments herein, for example, would not be possible without implementation of such embodiments in a specialized computer processing system. Such a system as described herein may, for example, enable processing of tens, hundreds, and/or thousands of gaming transactions in minutes, hours, or within a day, while such processing would not be possible in the absence of such a system. For convenience, such a specially-programmed system may be referred to herein as a "specialized computer processing system". In other words, embodiments conducted by a specialized computer processing system may not be possible to achieve in the absence of such a system and/or the speed at which such a system operates would simply not be reproducible by other available means. As a non-limiting example, a specialized computer processing system herein may be capable of receiving input descriptive of, processing, and outputting sorted bingo card win conditions to one thousand (1000) players in less than one (1) hour.

What is claimed is:

1. A method of dynamically modifying an interface of a mobile gaming device, comprising:

issuing, by a processing device and to a player of a bingo-style game, a plurality of bingo cards, each bingo card comprising a respective plurality of bingo play lines, each play line comprising a plurality of game symbols;

transmitting, by the processing device, first graphical user interface data defining how the issued bingo cards are to be displayed on a screen of a mobile gaming device of the player;

activating, by the processing device and after the issuing, a random number generator that generates indications of a plurality of active game symbols;

comparing, by the processing device and for each play line of each issued bingo card, the plurality of active game symbols to the plurality of game symbols of the play line;

identifying, by the processing device and based on the comparing, and for each play line of each issued bingo card, a proximity to win condition;

sorting, by the processing device, the proximity to win conditions for all of the play lines of the issued bingo cards;

transmitting, by the processing device, second graphical user interface data defining how the sorted proximity to win conditions are to be displayed on the screen of the mobile gaming device of the player;

receiving, by the processing device and from the mobile gaming device of the player, an indication of dimensional data for the screen of the mobile gaming device; and calculating, by the processing device and based on a count of the proximity to win conditions and the dimensional data for the screen of the mobile gaming device, a display size for a graphical interface component representing each proximity to win condition, wherein the second graphical user interface data comprises the calculated display size.

2. The method of claim 1, further comprising:

sorting, by the processing device, the proximity to win conditions based on a time of occurrence of each proximity to win condition.

3. The method of claim 2, wherein oldest occurring win conditions are placed higher in the sort order.

4. The method of claim 1, further comprising:

selecting, by the processing device and based on a predetermined proximity to win threshold, a subset of the proximity to win conditions that exceed the threshold, wherein the second graphical user interface data comprises an indication of the selected subset.

5. The method of claim 1, wherein the second graphical user interface data comprises data defining a plurality of graphical interface elements for display via the mobile gaming device, each graphical interface element representing a proximity to win condition from a different play line of a single bingo card.

* * * * *